US012465852B2

(12) United States Patent
Oura et al.

(10) Patent No.: US 12,465,852 B2

(45) Date of Patent: Nov. 11, 2025

(54) NON-TRANSITORY COMPUTER READABLE MEDIUM, INFORMATION PROCESSING METHOD, AND INFORMATION PROCESSING SYSTEM

(71) Applicant: CYGAMES, INC., Tokyo (JP)

(72) Inventors: Kazuhiro Oura, Tokyo (JP); Kohei Momiyama, Tokyo (JP); Satoru Okada, Tokyo (JP)

(73) Assignee: CYGAMES, INC., Tokyo (JP)

( * ) Notice: Subject to any disclaimer, the term of this patent is extended or adjusted under 35 U.S.C. 154(b) by 228 days.

(21) Appl. No.: 18/210,203

(22) Filed: Jun. 15, 2023

(65) Prior Publication Data

US 2023/0321534 A1 Oct. 12, 2023

Related U.S. Application Data

(63) Continuation of application No. PCT/JP2021/043802, filed on Nov. 30, 2021.

(51) Int. Cl.
*A63F 13/45* (2014.01)
*A63F 13/47* (2014.01)
(Continued)

(52) U.S. Cl.
CPC .............. *A63F 13/45* (2014.09); *A63F 13/47* (2014.09); *A63F 13/533* (2014.09); *A63F 13/69* (2014.09)

(58) Field of Classification Search
CPC ........ A63F 13/45; A63F 13/47; A63F 13/533; A63F 13/69; A63F 13/822; A63F 13/833; A63F 2300/807
See application file for complete search history.

(56) References Cited

U.S. PATENT DOCUMENTS

2013/0288757 A1* 10/2013 Guthridge ............... A63F 13/67 463/2

FOREIGN PATENT DOCUMENTS

JP 2014-217637 A 11/2014
JP 2017012424 A * 1/2017
(Continued)

OTHER PUBLICATIONS

"Skip Ticket Guide: How to use Skip Tickets? How to get them? Seven Deadly Sins: Grand Cross," published Jun. 6, 2020. Source : https://www.youtube.com/watch?v=KyTb2wRWKt4 (Year: 2020).*
(Continued)

*Primary Examiner* — Steven J Hylinski
(74) *Attorney, Agent, or Firm* — Osha Bergman Watanabe & Burton LLP

(57) ABSTRACT

A non-transitory computer readable medium stores a program causing a computer to execute: executing a game among a plurality of games on the basis of an operation performed by a player; granting at least one reward among a plurality of rewards when the game is cleared, depending on the cleared game; displaying a reward specifying screen on which the player can specify a desired reward among the plurality of rewards, the reward specifying screen displaying at least one game, among the plurality of games, in which the desired reward is available; displaying a skip selection screen displaying at least one game, among the plurality of games, in which the desired reward specified on the reward specifying screen is available and for which a skip process for omitting at least one function is executable; and executing the skip process for at least one game selected on the skip selection screen.

12 Claims, 18 Drawing Sheets

(51) Int. Cl.
*A63F 13/533* (2014.01)
*A63F 13/69* (2014.01)

(56) References Cited

FOREIGN PATENT DOCUMENTS

| | | | |
|---|---|---|---|
| JP | 2017-185268 | A | 10/2017 |
| JP | 2019-118794 | A | 7/2019 |

OTHER PUBLICATIONS

"Smartphone Yu Yu Hakusho 100% Serious Battle Repeat Skip Function Walkthrough," published Jan. 20, 2019. Source: https://takato56.com/yuhaku-maji-battle-revew-20190120/ (Year: 2019).*
"Skip Tickets Fantastic Frontier Roblox Wiki Fandom," published Dec. 22, 2018. Source: https://fantastic-frontier-roblox.fandom.com/wiki/Skip_Tickets (Year: 2018).*
BoomAppGames; "Monster Strike"—"Tower of Champions" with the Added Skip Function Will Appear as a Limited-Time Quest Starting on Sunday, Aug 7!; Aug. 5, 2016; Retrieved from Internet on Oct. 31, 2024; Retrieved from Internet: https://game.boom-app.com/entry/monsterstrikeevent20160805 (4 pages).
Gamebiz; Cygames Holds "5th Landosol Cup" to Celebrate the 2.5-Year Anniversary of "PriConne R." This Event Also Includes Addition of "Batch Quest Skip Function" and "Change Function."; Retrieved from Internet on Aug. 14, 2020; Retrieved from Internet: https://gamebiz.jp/news/273930 (7 pages).
International Search Report issued in corresponding International Application No. PCT/JP2021/043802, mailed on Jan. 18, 2022 (10 pages).
Written Opinion issued in corresponding International Application No. PCT/JP2021/043802, mailed on Jan. 18, 2022 (4 pages).
Office Action issued in counterpart Japanese Patent Application No. 2020-208219 mailed on Jul. 13, 2021 (4 pages).
Takato Games—Yu Yu Hakusho 100% Maji Battle Repeat Skip Function [Strategy], Retrieved from Internet on Aug. 17, 2020; Retrieved from Internet:: URL: https://takato56.com/yuhaku-maji-battlerevew-20190120/ (6 pages).

* cited by examiner

| QUEST TYPE | INCREASE IN REWARD DROPS | INCREASE IN MANA DROPS | INCREASE IN PLAYER EXPERIENCE VALUE |
|---|---|---|---|
| NORMAL | 1 | 1 | 1 |
| HARD | 0 | 0 | 0 |

FIG.14

NON-TRANSITORY COMPUTER READABLE MEDIUM, INFORMATION PROCESSING METHOD, AND INFORMATION PROCESSING SYSTEM

CROSS REFERENCE TO RELATED APPLICATIONS

This application is a continuation application of International Application No. PCT/JP2021/043802, filed on Nov. 30, 2021, which claims priority to Japanese Patent Application No. 2020-208219, filed on Dec. 16, 2020, the entire contents of which are incorporated by reference herein.

BACKGROUND ART

Technical Field

The present invention relates to an information processing program, an information processing method, and an information processing system.

As indicated, for example, in PTL 1, an information processing system has been proposed in which a game is treated as if cleared as a result of the game being skipped on the basis of a predetermined operation performed by a player.

CITATION LIST

Patent Literature

Patent Literature 1: JP 2017-185268 A

SUMMARY OF INVENTION

Technical Problem

Some information processing systems are configured so that rewards that can be granted when games are cleared differ from game to game. In such a case, the player needs to select a game that can grant the player a reward desired by the player and then execute that game. This is problematic because the player is obliged to take a lot of time and effort until he/she can earn the desired reward.

An object of the present invention is to provide an information processing program, an information processing method, and an information processing system that can save the player time and effort.

Solution to Problem

In order to solve the aforementioned problem, an information processing program causes a computer to function as: a game execution unit for executing a game on the basis of an operation performed by a player; a reward granting unit for granting a predetermined reward when the game is cleared; a reward-specifying-screen display unit for displaying a reward specifying screen on which the player can specify a desired reward; a display control unit for displaying a skip selection screen capable of displaying a plurality of the games that can each award the reward specified on the reward specifying screen and that can execute a skip process for omitting at least one function; and a skip game execution unit for executing, by means of the skip process, a game selected from the plurality of games displayed on the skip selection screen, wherein the reward-specifying-screen display unit displays the games each capable of awarding the reward that can be specified on the reward specifying screen.

The information processing program may cause the computer to function as a search screen display unit for displaying a search screen on which the player can specify at least one reward including the desired reward, wherein the display control unit may be capable of displaying a plurality of the games that can each award the at least one reward specified on the search screen and that can execute the skip process for omitting at least one function, identifiably display the at least one reward specified on the search screen in a predetermined region on the skip selection screen, and identifiably display, in the predetermined region, the reward specified on the reward specifying screen the first time the skip selection screen is displayed after the reward has been specified on the reward specifying screen.

The information processing program may cause the computer to function as an advantage-conditioning unit for assigning at least one of the games a condition advantageous to the player, wherein the display control unit may display additional information capable of identifying the at least one game assigned the advantageous condition.

The information processing program may cause the computer to function as a selection screen display unit for displaying a group selection screen on which the player can select at least one of a plurality of predetermined groups, wherein each of the games may belong to one of the plurality of groups, the advantageous condition may be assigned to the games, classified by the group, the selection screen display unit may add the additional information to the group to which the at least one game assigned the advantageous condition belongs and display the additional information, and the display control unit may be capable of displaying the plurality of games belonging to the at least one group selected by the player on the group selection screen.

In order to solve the aforementioned problem, an information processing method includes: a step of executing a game on the basis of an operation performed by a player; a step of granting a predetermined reward when the game is cleared; a step of displaying a reward specifying screen on which the player can specify a desired reward; a step of displaying a skip selection screen capable of displaying a plurality of the games that can each award the reward specified on the reward specifying screen and that can execute a skip process for omitting at least one function; and a step of executing, by means of the skip process, a game selected from the plurality of games displayed on the skip selection screen, wherein, in the step of displaying a reward specifying screen on which the player can specify a desired reward, the games each capable of awarding the reward that can be specified on the reward specifying screen are displayed.

In order to solve the aforementioned problem, an information processing system includes: a game execution unit for executing a game on the basis of an operation performed by a player; a reward granting unit for granting a predetermined reward when the game is cleared; a reward-specifying-screen display unit for displaying a reward specifying screen on which the player can specify a desired reward; a display control unit for displaying a skip selection screen capable of displaying a plurality of the games that can each award the reward specified on the reward specifying screen and that can execute a skip process for omitting at least one function; and a skip game execution unit for executing, by means of the skip process, a game selected from the plurality of games displayed on the skip selection screen, wherein the reward-specifying-screen display unit displays the games each capable of awarding the reward that can be specified on the reward specifying screen.

Effects of Disclosure

According to the present invention, the player can save time and effort.

BRIEF DESCRIPTION OF DRAWINGS

FIG. 14 is a diagram for illustrating an example of a campaign information table.

DESCRIPTION OF EMBODIMENTS

An aspect of an embodiment of the present invention will be described below in detail with reference to the accompanying drawings. The dimensions, materials, other specific numerical values, etc. given in this embodiment are merely examples for facilitating understanding and do not limit the present invention unless otherwise specifically mentioned. In this description and the drawings, the same reference signs are attached to elements having substantially the same functions and configurations, omitting repeated descriptions thereof, and elements that are not directly related to the present invention are not shown.

(Overall Configuration of Information Processing System S)

Figure 1:
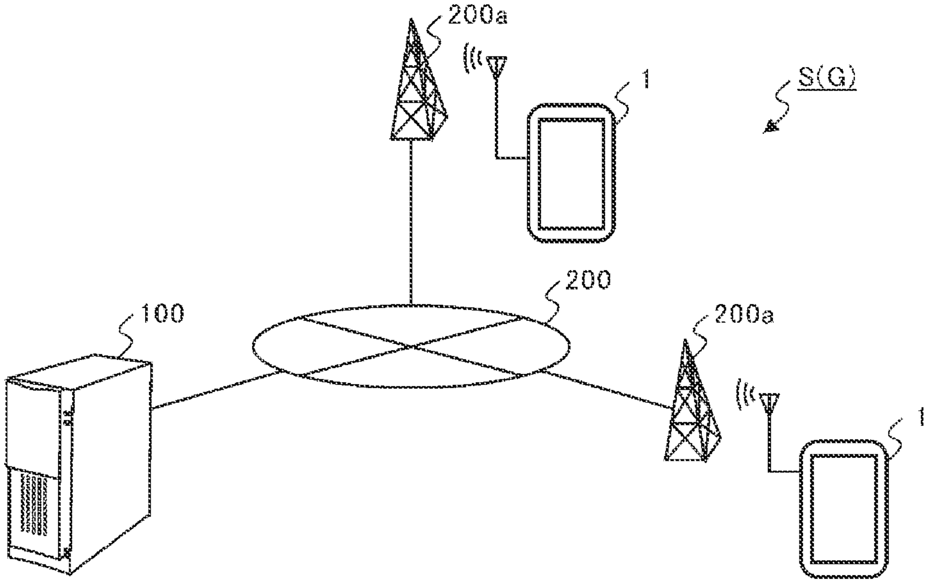
FIG. 1 is an illustration showing a schematic configuration of an information processing system.

FIG. 1 is an illustration showing a schematic configuration of an information processing system S. The information processing system S is a so-called client-server system that includes: player terminals 1; a server 100; and a communication network 200 having communication base stations 200*a*.

Each of the player terminals (information processing devices) 1 can establish communication with the server 100 via the communication network 200. The player terminals 1 widely include electronic appliances that can be communicatively connected to the server 100 by wire or wirelessly. Examples of the player terminals 1 include smartphones, mobile phones, tablet devices, personal computers, game machines, etc. This embodiment will be described in the context of the case where smartphones are used as the player terminals 1.

The server 100 is communicatively connected to the plurality of player terminals 1. The server 100 accumulates various kinds of information (player information) for each of the player IDs for identifying the players who play a game.

The communication base stations 200*a* are connected to the communication network 200, and transmit information to and receive information from the player terminals 1 wirelessly. The communication network 200 is configured of a mobile phone network, the Internet, a local area network (LAN), a dedicated line, etc., and realizes wired or wireless communicative connection between the player terminals 1 and the server 100.

In the information processing system S according to this embodiment, the player terminals 1 and the server 100 function as a game device G. The player terminals 1 and the server 100 individually have assigned thereto roles for controlling the proceeding of the game such that it is possible to proceed with the game through cooperation between the player terminals 1 and the server 100.

(Hardware Configurations of Player Terminal 1 and Server 100)

Figure 2A:
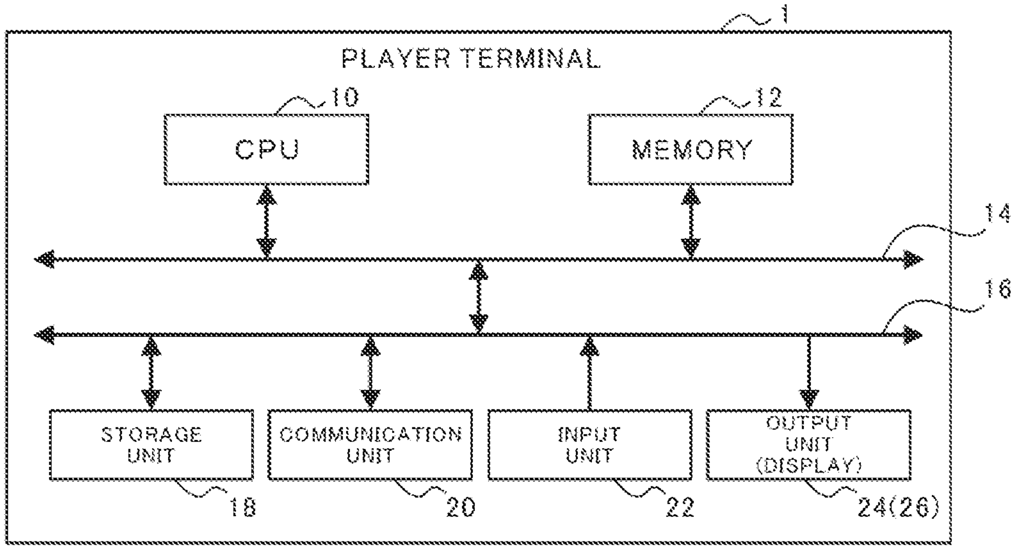
FIG. 2A is a diagram for illustrating the hardware configuration of a player terminal.
Figure 2B:
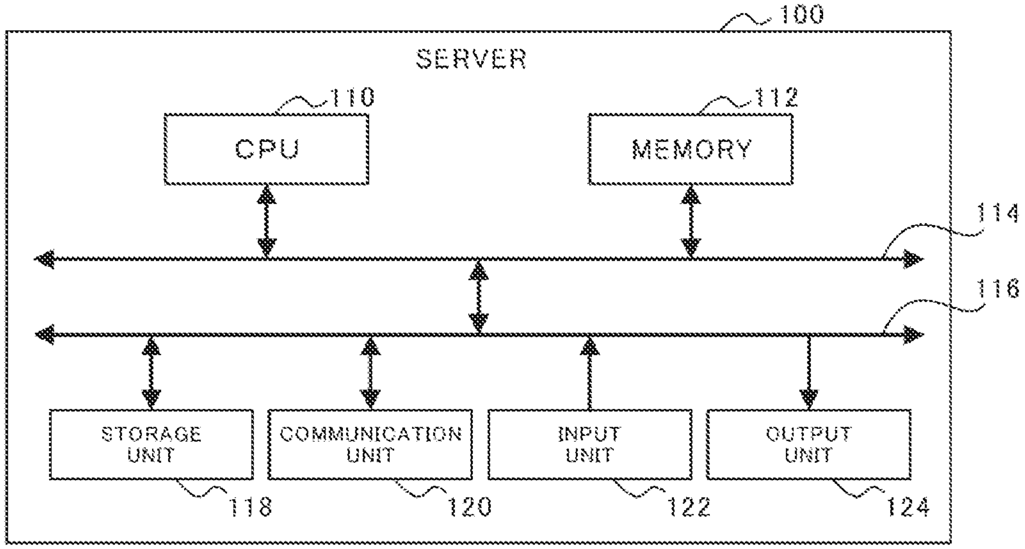
FIG. 2B is a diagram for illustrating the hardware configuration of a server.

FIG. 2A is a drawing for illustrating the hardware configuration of a player terminal 1. FIG. 2B is a drawing for illustrating the hardware configuration of the server 100. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

The configurations and functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24, respectively, of the player terminal 1. Thus, a description of the hardware configuration of the player terminal 1 will be given below, and a description of the server 100 will be omitted.

The CPU 10 runs programs stored in the memory 12 to control the proceeding of the game. The memory 12 is configured of a read only memory (ROM) or a random access memory (RAM), and stores programs needed for controlling the proceeding of the game, as well as various kinds of data. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory, such as a dynamic random access memory (DRAM), and stores various kinds of programs and data. At the player terminal 1, programs and data stored in the storage unit 18 are loaded into the memory 12 (RAM) by the CPU 10.

The communication unit 20 is communicatively connected to the communication base stations 200*a* in a wireless manner, and transmits information to and receives information from the server 100 via the communication network 200, such as various kinds of data and programs. At the player terminal 1, the programs, etc. received from the server 100 are stored in the memory 12 or the storage unit 18.

The input unit 22 is configured of, for example, a touchscreen, buttons, a keyboard, a mouse, a cross key, or an analog controller with which player operations are input (operations are accepted). Alternatively, the input unit 22 may be a special controller provided in the player terminal 1 or connected (externally attached) to the player terminal 1. Yet alternatively, the input unit 22 may be configured of an acceleration sensor that detects tilting or movement of the player terminal 1 or a microphone that detects speech of the player. That is, the input unit 22 widely includes devices that enable the player to input his or her intents in distinguishable manners.

The output unit 24 is configured to include a display device and a speaker. The output unit 24 may be a device connected (externally attached) to the player terminal 1. In this embodiment, the player terminal 1 is provided with a display 26 as the output unit 24 and is provided with a touchscreen as the input unit 22, wherein the touchscreen is overlaid on the display 26.

(Game Content)

Next, an example of the content of the game provided by the information processing system S (game device G) in this embodiment will be described. This embodiment provides a so-called battle game in which ally characters combat with enemy characters. More specifically, a plurality of ally characters are provided in the game of this embodiment. The player selects a plurality of (five here) ally characters from among the provided ally characters, thereby organizing a party. In addition, the player can play a plurality of types of battle games with different enemy characters and difficulty levels. A purpose of this battle game is to earn a reward by beating the enemy characters (clearing the battle game) by means of the ally characters organized into a party.

Figure 3A:
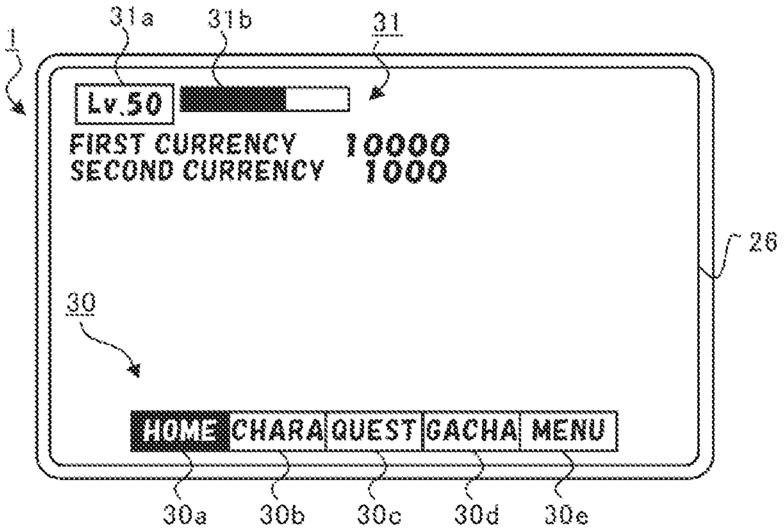
FIG. 3A is a diagram for illustrating an example of a home screen.
Figure 3B:
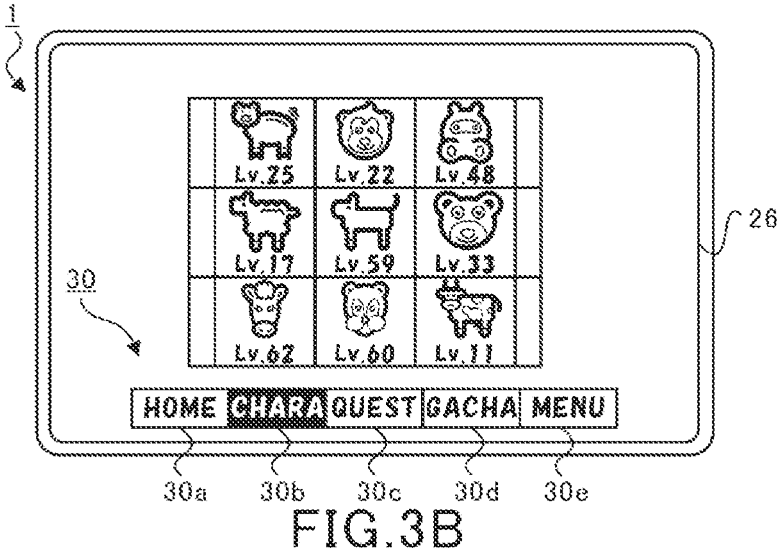
FIG. 3B is a diagram for illustrating an example of an ally character confirmation screen.
Figure 3C:
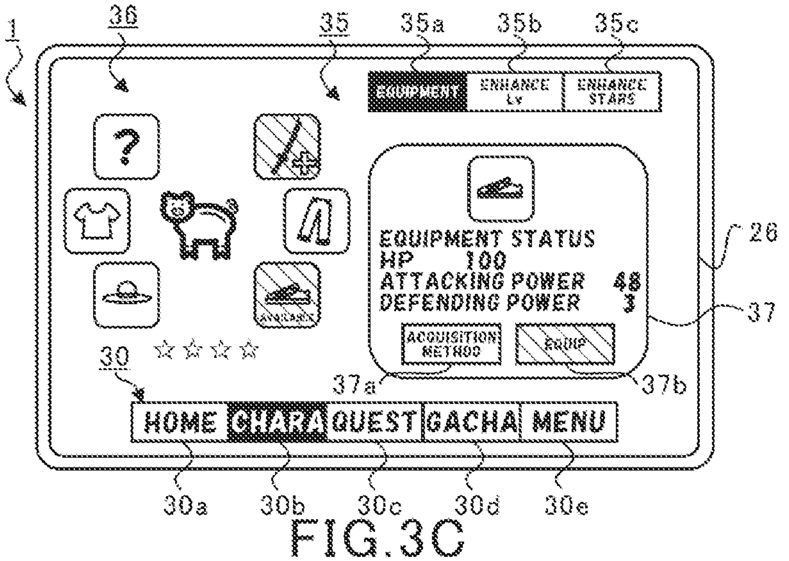
FIG. 3C is a diagram for illustrating an example of an ally character detailed screen.
Figure 4A:
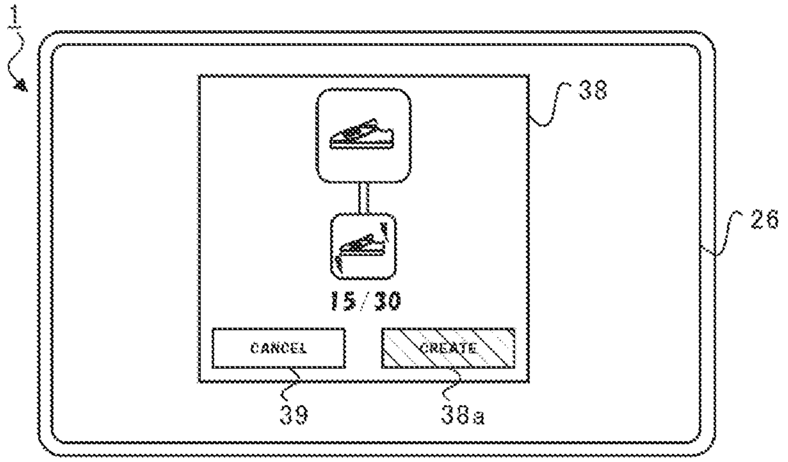
FIG. 4A is a diagram for illustrating an example of an acquisition method pop-up.
Figure 4B:
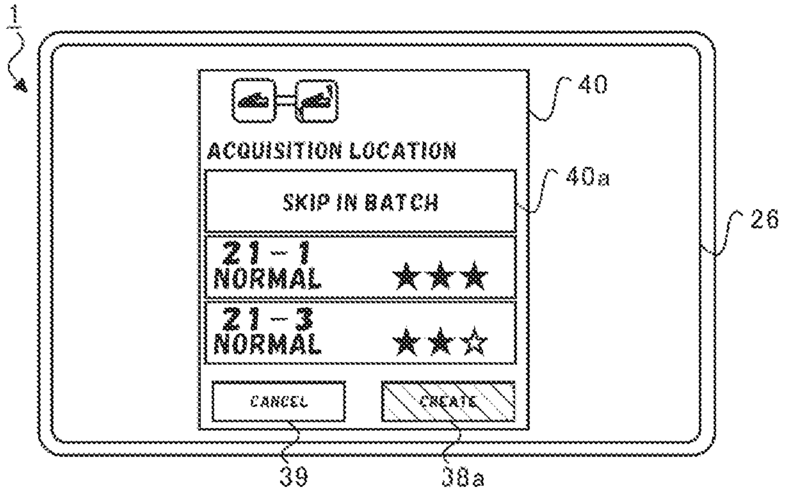
FIG. 4B is a diagram for illustrating an example of an acquisition location pop-up.
Figure 4C:
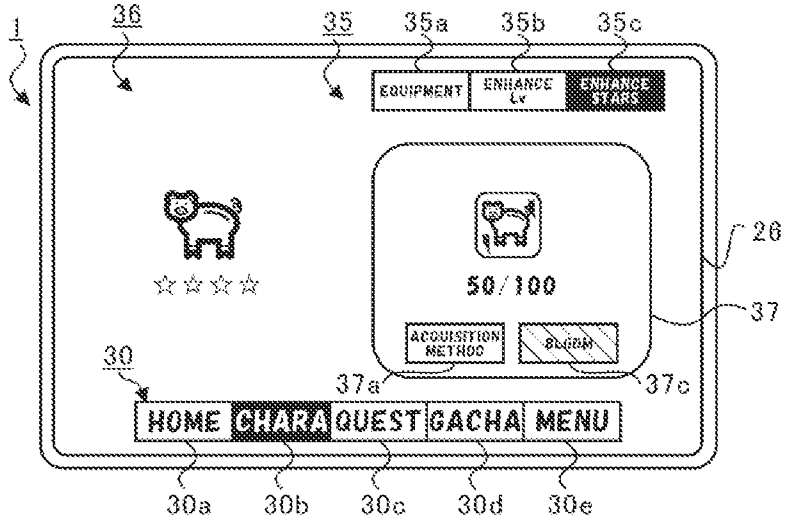
FIG. 4C is a diagram for illustrating an example of an ally character detailed screen.
Figure 5A:
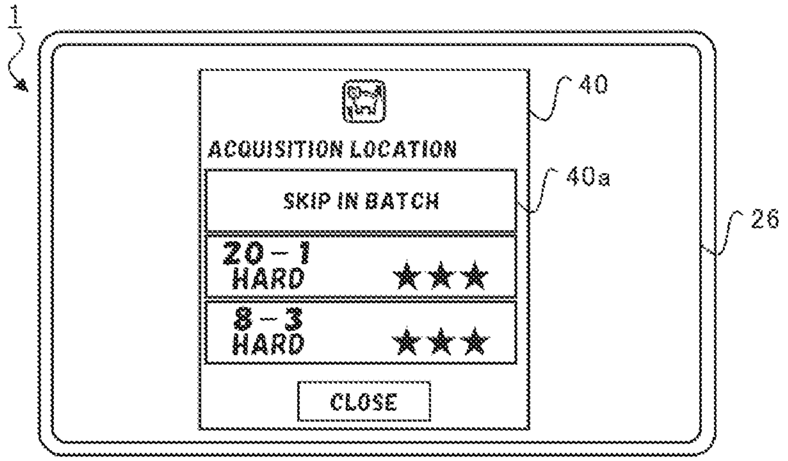
FIG. 5A is a diagram for illustrating an example of an acquisition location pop-up.
Figure 5B:
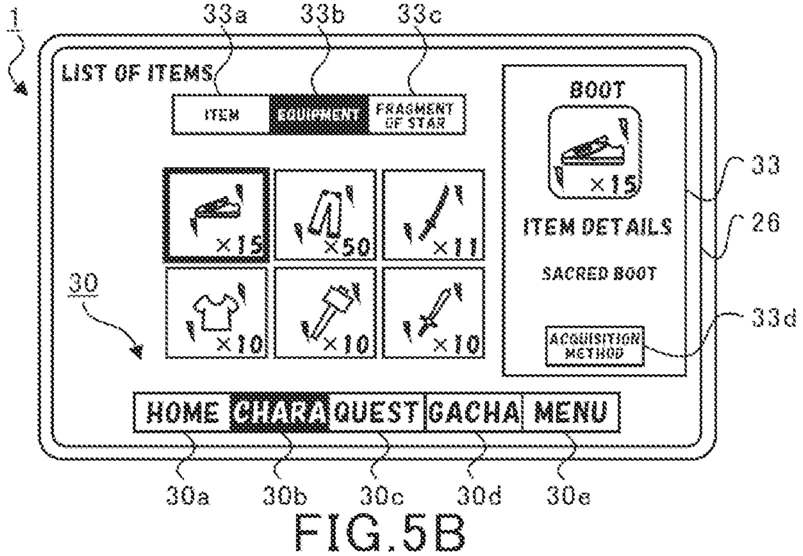
FIG. 5B is a diagram for illustrating an example of a possessed-item list screen.
Figure 5C:
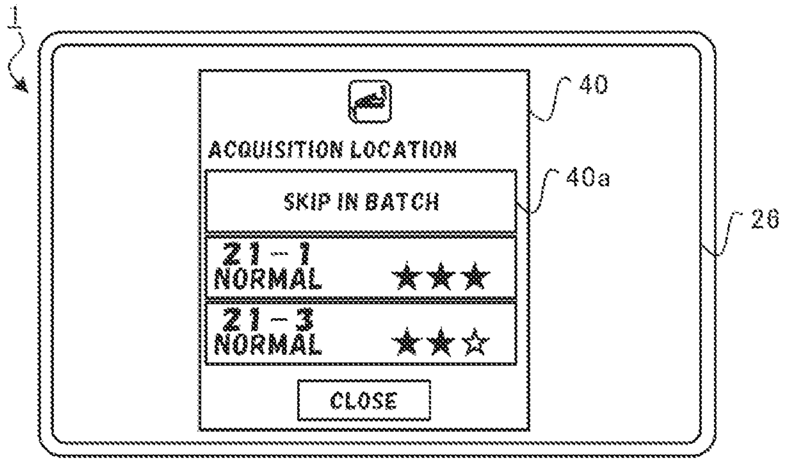
FIG. 5C is a diagram for illustrating an example of an acquisition location pop-up.

FIG. 3A is a diagram for illustrating an example of a home screen. FIG. 3B is a diagram for illustrating an example of an ally character confirmation screen. FIG. 3C is a diagram for illustrating an example of an ally character detailed screen. FIG. 4A is a diagram for illustrating an example of an acquisition method pop-up 38. FIG. 4B is a diagram for illustrating an example of an acquisition location pop-up 40. FIG. 4C is a diagram for illustrating an example of the ally character detailed screen. FIG. 5A is a diagram for illustrating an example of the acquisition location pop-up 40. FIG. 5B is a diagram for illustrating an example of a possessed-item list screen. FIG. 5C is a diagram for illustrating an example of the acquisition location pop-up 40. A game screen is displayed on the display 26 of the player terminal 1. In this embodiment, the game screen is roughly classified into normal screens and a battle screen.

The normal screens are screens on which the player mainly performs various types of settings and confirms information. On the other hand, the battle screen is a screen displayed on the display 26 from the start to the end of a battle game. Here, all screens other than the battle screen are normal screens. The normal screens include a plurality of screens including the home screen shown in FIG. 3A, the ally character confirmation screen shown in FIG. 3B, and a quest screen (refer to FIG. 6A), as well as a guild screen, a gacha screen, a menu screen, etc. (not shown in the figure).

On each of the normal screens, a menu bar 30 is displayed at the bottom of the display 26, as shown in FIGS. 3A to 3C. A plurality of operation sections that can be operated (tapped) by the player are provided in the menu bar 30. A home-screen selection operation section 30*a* captioned "Home", an ally-character-confirmation-screen selection operation section 30*b* captioned "Chara", a quest-screen selection operation section 30*c* captioned "Quest", a gacha-screen selection operation section 30*d* captioned "Gacha", and a menu-screen selection operation section 30*e* captioned "Menu" are provided in the menu bar 30.

When the home-screen selection operation section 30*a* is tapped, the home screen shown in FIG. 3A is displayed on the display 26. In addition, when the ally-character-confirmation-screen selection operation section 30*b* is tapped, the ally character confirmation screen shown in FIG. 3B is displayed on the display 26. Similarly, when the quest-screen selection operation section 30*c* is tapped, the quest screen shown in FIG. 6A (described below) is displayed on the display 26. In addition, when the gacha-screen selection operation section 30*d* is tapped, the gacha screen (not shown in the figure) is displayed on the display 26. In addition, when the menu-screen selection operation section 30*e* is tapped, the menu screen (not shown in the figure) is displayed on the display 26. Although a detailed explanation is omitted, the gacha screen allows the player to perform a so-called gacha lottery, in which an ally character can be earned by lottery. In addition, on the menu screen, the player can confirm various items of information such as game settings and a list of items possessed by the player.

In the menu bar 30, the operation section corresponding to the screen being displayed on the display 26 is highlighted so that which screen is displayed can be identified. For example, the home-screen selection operation section 30*a* is highlighted in FIG. 3A. In addition, the ally-character-confirmation-screen selection operation section 30*b* is highlighted in FIGS. 3B and 3C.

The home screen shown in FIG. 3A corresponds to an initial screen, and a header display region 31 is provided in the upper section. In the header display region 31, level information 31*a* indicating the player level associated with the player ID is displayed. In addition, in the header display region 31, a stamina indication bar 31*b* indicating the stamina of the player associated with the player ID is displayed. In addition, in the header display region 31, the possessed amounts of first currency and second currency that are associated with the player ID are displayed.

Note that the stamina is a parameter required to play a battle game. In this system, a plurality of types of battle games are provided. Each of the battle games has set thereto a consumption value of stamina required to play the battle game and the number of times the battle game can be played per day, etc. When the player is to play a battle game in which the consumption value of stamina required to play the battle game is set, the player plays the battle game by consuming stamina. For this reason, the player cannot play the battle game when the stamina is insufficient.

Although a detailed explanation is omitted, the player can earn a predetermined value as a player experience value when the player clears a battle game. Also, each time the player experience value reaches a certain value, the player level increases. The player level has an upper limit value of stamina set thereto. As the player level increases, the upper limit value of stamina also becomes higher. Stamina is restored every certain time period (e.g., every five minutes) by a predetermined value (e.g., one point) within the range defined by the upper limit value. The stamina indication bar 31*b* is displayed so that the current remaining amount of stamina with respect to the upper limit value of stamina is visually recognizable.

The first currency and the second currency are currencies that can be used only in a game. For example, when a battle game is cleared, a predetermined amount of the first currency can be earned depending on the battle game that is cleared. The second currency can be earned for free or for a fee. Note that the first currency and the second currency can be earned in various ways, but a detailed description is omitted.

On the ally character confirmation screen shown in FIG. 3B, images of all ally characters corresponding to the ally character IDs associated with the player ID are displayed. More specifically, on the ally character confirmation screen, all ally characters possessed by the player are displayed. Ally character IDs are used to identify ally characters. Also, different ally character IDs are assigned to different ally characters. Also, when the player earns a new ally character by, for example, gacha lottery or the like, the ally character ID of the earned ally character is associated with the player ID of the player.

For each of the ally characters, stars (rank), an experience value, and a level are stored in association with the ally character. The experience value increases when the player wins a battle game (described later) or uses a predetermined item. The level is set in accordance with the experience value, and the level increases each time the experience value reaches a predetermined value. Note that each of the ally characters has an upper limit value of level set thereto, and the level increases only within the range defined by the upper limit value.

Furthermore, each of the ally characters has set thereto base values of battle abilities, including life points, an attacking power, and a defending power, on the basis of the stars and the level. The higher the battle abilities of the ally characters are, the more advantageous the player becomes in proceeding with a battle game. Furthermore, the larger the number of stars and the higher the level, the higher the base values set to each of the ally characters.

Furthermore, ally characters can be equipped with items of equipment such as weapons and protectors (ally characters can have items of equipment set thereon). Each of the items of equipment has set thereto additional values to be added to the attacking power, the defending power, etc. When an ally character is equipped with equipment, the additional values of the equipment are added to the above-described base values, making it possible to enhance the battle abilities of the ally character.

More specifically, when the image of an ally character displayed on the ally character confirmation screen shown in FIG. 3B is operated, the ally character detailed screen shown in FIG. 3C is displayed on the display 26. On the ally character detailed screen, an ally-character-enhancement selection operation section 35, an enhancement item display region 36, and an enhancement-detail display region 37 are displayed. An equipment selection operation section 35*a*, a Lv enhancement selection operation section 35*b*, and a star enhancement selection operation section 35*c* are provided in the ally-character-enhancement selection operation section 35. In the ally-character-enhancement selection operation section 35, one of the operation sections is selected, and the selected operation section is highlighted.

When the equipment selection operation section 35*a* in the ally-character-enhancement selection operation section 35 is selected (operated), six items of equipment are displayed around the image of the ally character in the enhancement item display region 36. Here, among the six items of equipment, the items of equipment with which the ally character is not equipped are displayed in gray, as shown by hatching in the figure, while the items of equipment with which the ally character is equipped are displayed in color.

In addition, among the items of equipment with which the ally character is not equipped (the items of equipment in the upper right and lower right in the figure), the items of equipment that are already possessed by the ally character (including the items of equipment that can be created) are labelled a "+" mark, as shown on the item of equipment in the upper right in the figure. On the other hand, the items of equipment not possessed by the ally character (including the items of equipment that cannot be created) are captioned "Available", as shown on the item of equipment in the lower right in the figure. In addition, the items of equipment that have not been implemented in a game, such as the item of equipment in the upper left in the figure, are indicated by "?".

When any of the items of equipment in the enhancement item display region 36 is operated (tapped), the statuses of the operated item of equipment are displayed in the enhancement-detail display region 37. In addition, an acquisition-method operation section 37*a* for displaying the method of acquiring the equipment and an equipment operation section 37*b* for equipping the ally character with the item of equipment are provided in the enhancement-detail display region 37.

Also, when the acquisition-method operation section 37*a* is operated, the acquisition method pop-up 38 shown in FIG. 4A is displayed on the display 26. In the acquisition method pop-up 38, not only is the item required to create the equipment displayed but also the number of items possessed by the player with respect to the number of items required to create the equipment (required number of items) is displayed in the form of, for example, 15/30. In addition, a cancel operation section 39 captioned "Cancel" for canceling the process corresponding to the currently displayed screen and a creation operation section 38*a* for creating the equipment are displayed in the acquisition method pop-up 38. Note that in the case where the number of items possessed by the player is less than the required number of items, the equipment operation section 37*b* and the creation operation section 38*a* are grayed out as shown by hatching in the figures so as not to accept a player operation.

Then, when the item displayed in the acquisition method pop-up 38 is operated (tapped), the acquisition location pop-up 40 shown in FIG. 4B is displayed on the display 26. As described in detail below, items that can be earned when games are cleared are preset for each battle game. Then, battle games in which the item operated in the acquisition method pop-up 38 can be earned are displayed in the acquisition location pop-up 40. In addition, an icon indicating the item (reward) operated in the acquisition method pop-up 38 is displayed in the upper section of the acquisition location pop-up 40.

In addition, the cancel operation section 39, the creation operation section 38*a*, and a skip operation section 40*a* are displayed in the acquisition location pop-up 40. Thereafter, when the operation tab for each of the battle games displayed in the acquisition location pop-up 40 is operated (tapped), a quest selection screen (see FIG. 6B) described below is displayed on the display 26.

On the other hand, screen transition and processing therefor that are executed when the skip operation section 40*a* displayed in the acquisition location pop-up 40 is operated (tapped) are described in detail below.

Also, in the case where the number of items possessed by the player meets the required number of items, the creation operation section 38*a* shown in FIGS. 4A and 4B is enabled, and when the creation operation section 38*a* is operated, the corresponding equipment is created. Also, in the case where the number of items possessed by the player meets the required number of items, the equipment operation section 37*b* shown in FIG. 3C is enabled, and when the equipment operation section 37*b* is operated (tapped), the ally character is equipped with the equipment.

In addition, although a detailed explanation is omitted, when the Lv enhancement selection operation section 35*b* on the ally character detailed screen shown in FIG. 3C is operated (tapped), the level of the ally character is displayed in the enhancement item display region 36, and an item for increasing the level is displayed in the enhancement-detail display region 37. Then, when the item is operated (tapped), the tapped item is used to increase the experience value (level) of the ally character.

In addition, when the star enhancement selection operation section 35*c* on the ally character detailed screen shown in FIG. 3C is operated (tapped), the current stars (rank) of the ally character are displayed in the enhancement item display region 36, and a star enhancement item for enhancing the stars is displayed in the enhancement-detail display region 37. In the enhancement-detail display region 37, not only is a star enhancement item required to enhance the stars displayed but also the number of star enhancement items possessed by the player with respect to the number of star enhancement items required to enhance the stars (required number of items) is displayed in the form of, for example, 50/100.

In addition, in the enhancement-detail display region 37, the acquisition-method operation section 37*a* for displaying the method of acquiring the star enhancement item and a blooming operation section 37*c* for enhancing the stars are provided. When the acquisition-method operation section 37*a* is operated, the acquisition location pop-up 40 shown in FIG. 5A is displayed. When the number of star enhancement items possessed by the player meets the required number of items and the blooming operation section 37*c* is operated, the stars of the ally character are enhanced by one. In the case where the number of star enhancement items for enhancing the stars is less than the required number of items, the blooming operation section 37*c* is grayed out as shown by hatching in FIG. 4C so as not accept a player operation.

In addition, when the player performs a predetermined operation for checking the list of items possessed by himself/herself on the menu screen (not shown in the figure) that is displayed as a result of the menu-screen selection operation section 30*e* being tapped, the item list screen shown in FIG. 5B is displayed on the display 26. In the upper section of the item list screen, a possessed-item-list operation section 33*a*, a possessed-equipment-list operation section 33*b*, a possessed-star-enhancement-item-list operation section 33*c* are provided. On the item list screen, one of the possessed-item-list operation section 33*a*, the possessed-equipment-list operation section 33*b*, and the possessed-star-enhancement-item-list operation section 33*c* is selected, and the selected operation section is highlighted.

When the possessed-equipment-list operation section 33*b* is selected (operated), all items of equipment possessed by the player are displayed as shown in FIG. 5B, together with the number of items of equipment possessed by the player. When any of the items of equipment being displayed is operated (tapped), detailed information concerning the operated equipment is displayed in a detailed information display region 33. In addition, an acquisition-method operation section 33*d* for displaying a method of acquiring the equipment is provided in the detailed information display region 33. Also, when the acquisition-method operation section 33*d* is operated, the acquisition location pop-up 40 shown in FIG. 5C is displayed.

Figure 6A:
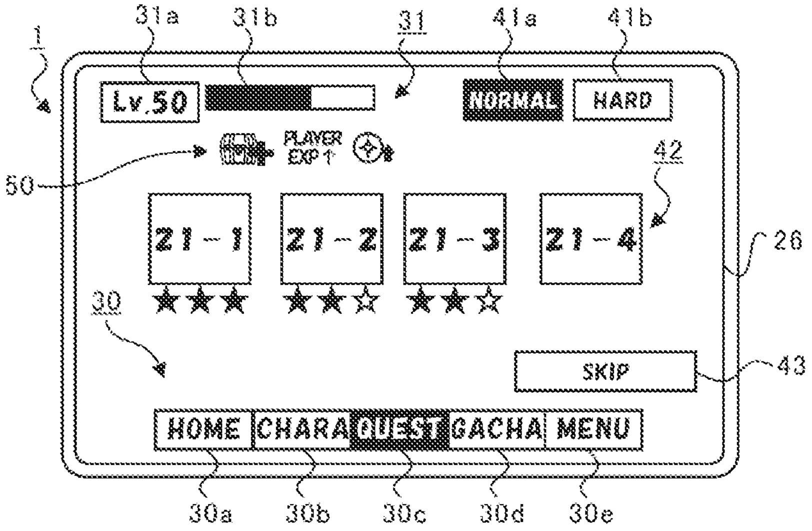
FIG. 6A is a diagram for illustrating an example of a quest screen of a normal quest.
Figure 6B:
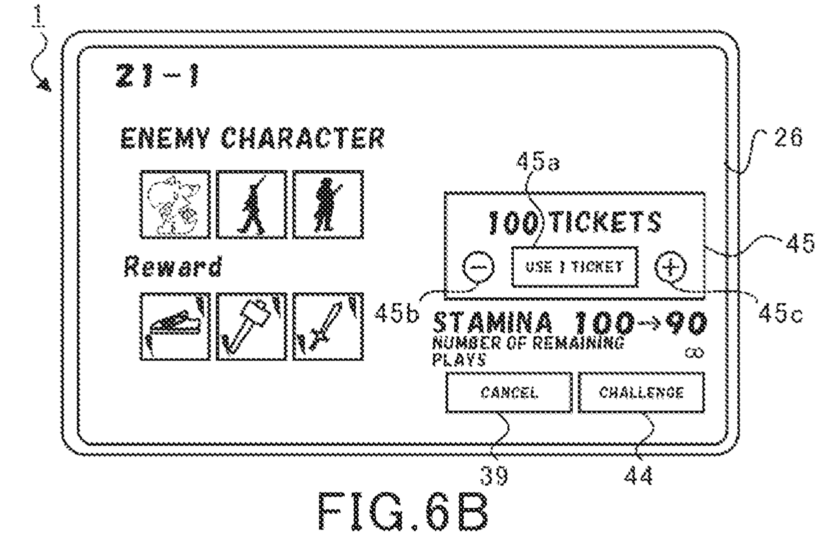
FIG. 6B is a diagram for illustrating an example of a quest selection screen of a normal quest.
Figure 6C:
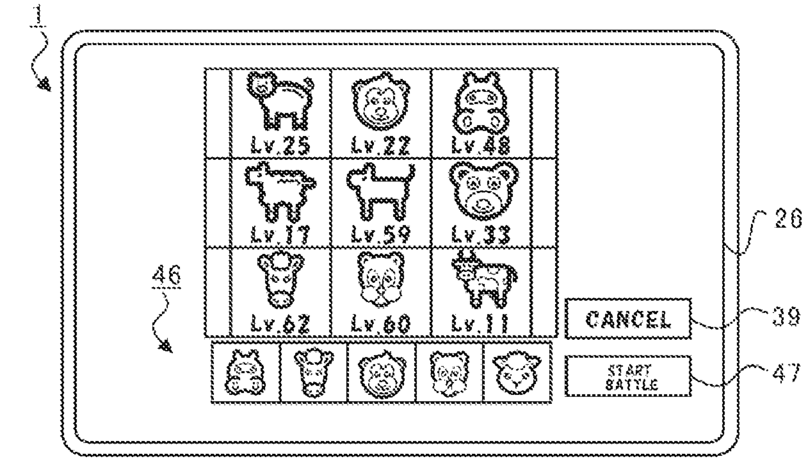
FIG. 6C is a diagram for illustrating an example of a party selection screen.

FIG. 6A is a diagram for illustrating an example of the quest screen of a normal quest. FIG. 6B is a diagram for illustrating an example of the quest selection screen of the normal quest. FIG. 6C is a diagram for illustrating an example of a party selection screen.

When the quest-screen selection operation section 30*c* is operated (tapped) on the home screen shown in FIG. 3A, the quest screen shown in FIG. 6A is displayed on the display 26. This embodiment is described with examples of two types of battle games including the normal quest and a hard quest, but other types of battle games (such as guild battles) may be provided.

Note that some types of battle games have release conditions set therein. The release conditions include, for example, the player level being above a predetermined value, the player having cleared another predetermined battle game, etc. In addition, a plurality of battle games (tiers) belong to each type of battle games. Each of these battle games also has release conditions set therein. When the release conditions are met, game release information included in the player information is updated.

A normal-quest selection operation section 41*a* for selecting the normal quest and a hard-quest selection operation section 41*b* for selecting the hard quest are provided on the quest screen. The quest screen appears so that either the normal-quest selection operation section 41*a* or the hard-quest selection operation section 41*b* is always selected on the quest screen. In the example of FIG. 6A, the normal-quest selection operation section 41*a* is initially selected on the quest screen.

In the case where the normal-quest selection operation section 41*a* is selected, a quest operation section 42 for selecting one of the plurality of battle games (tiers) belonging to the normal quest is displayed on the quest screen. A quest-list operation section 43 for skipping one or more battle games collectively is also displayed on the quest screen. Details of screen transition and processing therefor when the quest-list operation section 43 is operated (tapped) are described below.

Clear information for each battle game is also displayed in the quest operation section 42. The clear information is indicated, for example, by three stars. In a battle game, when that battle game is cleared, stars are earned according to the number of ally characters whose life points are 0 at the time the battle game is cleared. For example, three stars are earned in the case where there are no ally characters whose life points are 0. Also, two stars are earned in the case where there is one ally character whose life points are 0. Moreover, one star is earned in the case where there are two or more ally characters whose life points are 0.

In the example of FIG. 6A, three stars are earned in the "21-1" battle game. Also, two stars are earned in the "21-2" battle game. In addition, two stars are earned in the "21-3" battle game. Furthermore, no stars are earned in the "21-4" battle game, indicating that this battle game is not cleared.

Note that quests (normal and hard quests) have release conditions that the previous battle game is cleared. For example, in the example of FIG. 6A, because the battle games up to the "21-3" battle game are cleared, the "21-4" battle game is released, but the subsequent battle games ("21-5" and after, not shown in the figure) are not released.

When the quest operation section 42 corresponding to, for example, the "21-1" battle game is operated (tapped) on the quest screen, the quest selection screen shown in FIG. 6B is displayed on the display 26. On the quest selection screen, enemy characters who will appear in the battle game and items (rewards) that can be earned in the battle game are displayed. In addition, on the quest selection screen, the stamina before and after the play of that battle game and the number of remaining plays are displayed. The number of remaining plays indicates the number of times the game can be played in a day and is set to infinite in battle games of the normal quest. In addition, the stamina consumed in a battle game of the normal quest is set to 10 in this embodiment. However, the stamina consumed in battle games of the normal quest may be set differently for each battle game.

In addition, on the quest selection screen, the cancel operation section 39, as well as a challenge operation section 44, captioned "Challenge", for playing the battle game, is displayed.

When the cancel operation section 39 is operated (tapped), the quest screen shown in FIG. 6A is displayed on the display 26, cancelling the play of the selected "21-1" battle game.

On the other hand, when the challenge operation section 44 is operated (tapped), the party selection screen shown in FIG. 6C is displayed on the display 26. On the party selection screen, all ally characters possessed by the player are displayed, and, below the ally characters, a selected-ally-character display region 46 for displaying the selected ally characters is provided.

In addition, on the party selection screen, the cancel operation section 39 and a battle-start operation section 47, captioned "Start battle", are displayed.

On the party selection screen, when the player operates (taps) a displayed ally character, the operated ally character is displayed in the selected-ally-character display region 46. More specifically, here, ally character IDs to be used in the battle game (to determine a party) are selected from among the plurality of ally character IDs associated with the player ID.

Then, when ally characters (ally character IDs) are selected and the battle-start operation section 47 is operated (tapped), the battle game starts.

Figure 7A:
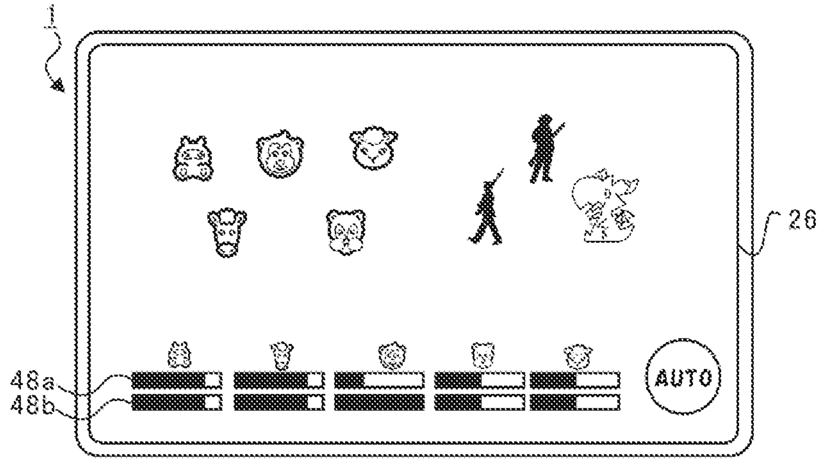
FIG. 7A is a diagram for illustrating an example of a battle screen.
Figure 7B:
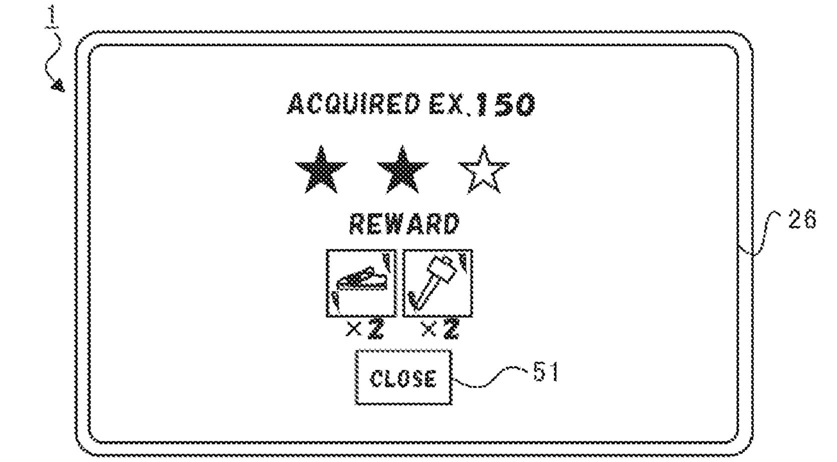
FIG. 7B is a diagram for illustrating an example of a result screen.
Figure 7C:
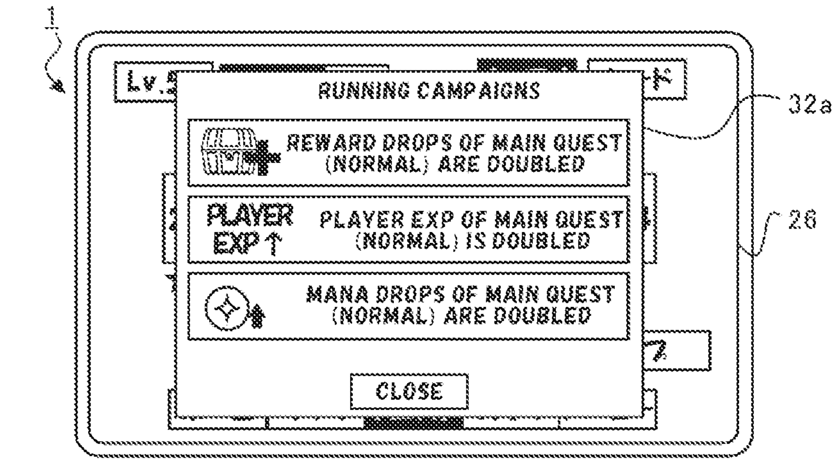
FIG. 7C is a diagram for illustrating an example of a campaign pop-up.

FIG. 7A is a diagram for illustrating an example of the battle screen. FIG. 7B is a diagram for illustrating an example of a result screen. FIG. 7C is a diagram for illustrating an example of a campaign pop-up. When the battle-start operation section 47 is operated (tapped) on the party selection screen shown in FIG. 6C, the battle game is started.

During the battle game, the battle screen, as shown in FIG. 7A, is displayed. On the battle screen, ally characters and enemy characters are displayed on the display 26. The ally characters are operated via computer control, inflicting damage on the enemy characters and suffering damage from the enemy characters. In addition, the enemy characters are operated via computer control, inflicting damage on the ally characters and suffering damage from the ally characters.

When an enemy character is given damage points, the damage points are subtracted from the life points of the enemy character. Similarly, when an ally character is given damage points, the damage points are subtracted from the life points of the ally character. When the life points of all enemy characters become 0, the player wins the battle game (clears the battle game), and when the life points of all ally characters become 0 (loses the battle game), the player loses the battle game.

Also, when the battle game normally ends (normal end), the result screen is displayed on the display 26, as shown in FIG. 7B. FIG. 7B shows a result screen in the case where the battle game is cleared, as an example.

On the result screen, a report display operation section, captioned "Report", and an end operation section 51, captioned "Close", are displayed, together with at least some of items of game result information of the battle game.

The game result information includes information concerning the items that have been granted. When the battle game is cleared, the server 100 determines by lottery whether or not to grant the player each of the items that are preset in the cleared battle game. The items to be granted to the player are then assigned to the game result information and are displayed on the result screen.

When the end operation section 51 is operated (tapped) on the result screen, display of the display 26 switches from the battle screen to a normal screen.

In addition, a ticket display region 45 is provided on the quest selection screen shown in FIG. 6B. The ticket display region 45 displays the number of tickets possessed by the player (the number of tickets associated with the player ID) and is provided with a ticket-use-challenge operation section 45*a*, a minus operation section 45*b*, and a plus operation section 45*c*. The ticket-use-challenge operation section 45*a*, the minus operation section 45*b*, and the plus operation section 45*c* are enabled only in battle games in which three stars have been earned as clear information and are disabled in battle games in which three stars have not been earned as clear information.

In the case where the ticket-use-challenge operation section 45*a*, the minus operation section 45*b*, and the plus operation section 45*c* are enabled, each time the plus operation section 45c is operated (tapped), the text appearing in the ticket-use-challenge operation section 45a changes so that the number of tickets increases one by one, such as "Use 2 tickets" and "Use 3 tickets". In addition, each time the minus operation section 45b is operated (tapped), the text appearing in the ticket-use-challenge operation section 45a changes so that the number of tickets decreases one by one, such as "Use 2 tickets" and "Use 1 ticket".

Also, when the ticket-use-challenge operation section 45a is operated (tapped) in the case where the text appearing in the ticket-use-challenge operation section 45a reads, for example, "Use 5 tickets", five tickets and 50 stamina are consumed, thereby omitting (skipping) the creation of a party on the party selection screen shown in FIG. 6C and the execution of the battle game on the battle screen shown in FIG. 7A. This causes the battle game to be treated as if cleared five times and displays the result screen as shown in FIG. 7B. On this result screen, items earned in five times of the battle game are collectively displayed.

Thus, when the player consumes tickets, the battle games in which three stars are earned as clear information are omitted and are treated as if cleared. This allows the player to collect items in a shorter period of time.

Figure 8A:
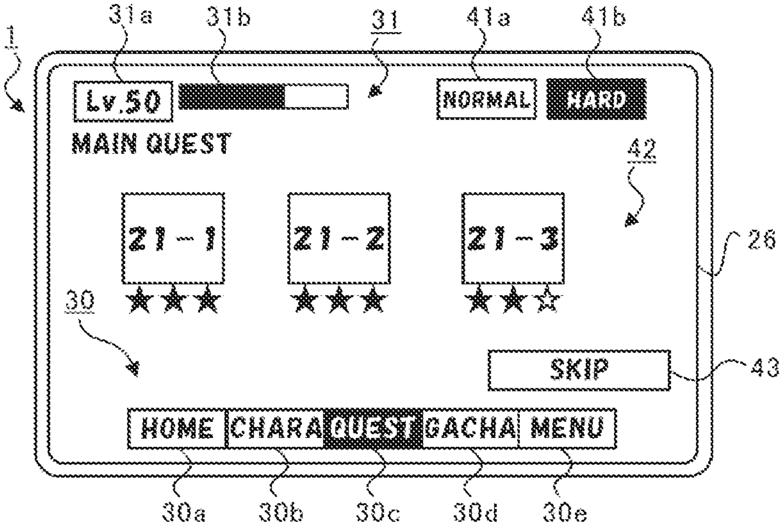
FIG. 8A is a diagram for illustrating an example of a quest screen of a hard quest.
Figure 8B:
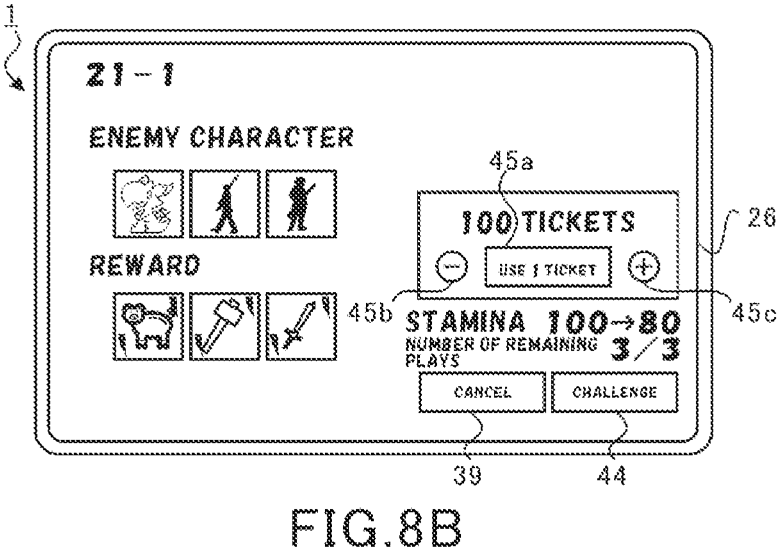
FIG. 8B is a diagram for illustrating an example of a quest selection screen of a hard quest.

Next, the hard quest is described. FIG. 8A is a diagram for illustrating an example of the quest screen of the hard quest. FIG. 8B is a diagram for illustrating an example of the quest selection screen of the hard quest. Explanations of the same parts as for the normal quest are omitted. In the case where the hard-quest selection operation section 41b is selected as shown in FIG. 8A, the quest operation section 42 for selecting one of the plurality of battle games (tiers) belonging to the hard quest is displayed on the quest screen. Also, the quest-list operation section 43 for skipping one or more battle games collectively is displayed on the quest screen. Details of screen transition and processing therefor when the quest-list operation section 43 is operated (tapped) are described below.

Clear information for each battle game is also displayed in the quest operation section 42. In the example in FIG. 8A, three stars are earned in the "21-1" battle game. Also, three stars are earned in the "21-2" battle game. Also, two stars are earned in the "21-3" battle game.

When the quest operation section 42 corresponding to, for example, the "21-1" battle game is operated (tapped) on the quest screen, the quest selection screen shown in FIG. 8B is displayed on the display 26. Unlike the normal quest, the hard quest is set so that three plays per day are allowed. Therefore, if the text in the ticket-use-challenge operation section 45a reads "Use 3 tickets" when the player is to play a battle game using a ticket, the text does not change even when the player further operates (taps) the plus operation section 45c.

Also, if one battle game is played three times, the number of remaining plays for that day will be 0 (0/3). However, the remaining number of plays can be restored to 3 only once per day by spending the second currency. More specifically, one battle game of the hard quest can be played a maximum of six times per day.

In addition, the stamina consumed in a battle game of the hard quest is set to 20 in this embodiment. However, the stamina consumed in battle games of the hard quest may be made different for each battle game or may be set to 10, as in the normal quest.

In addition, when the player clears a battle game of the hard quest, he/she can earn an item for enhancing the stars of an ally character. On the other hand, even if the player clears a battle game of the normal quest, he/she cannot earn an item for enhancing the stars of an ally character.

In addition, on the quest screen of the normal quest in FIG. 6A, campaign information icons 50 for informing the player of campaigns that are currently running are displayed. In this embodiment, three types of campaigns are running in the normal quest, and three types of campaign information icons 50 according to the types of the running campaigns are displayed. More specifically, in this embodiment, campaigns are set for each of the groups (normal quest and hard quest) to which battle games belong, i.e., campaigns are set on a group basis.

On the other hand, this embodiment assumes that no campaigns are running in the hard quest. Therefore, no campaign information icons 50 are displayed on the quest screen of the hard quest in FIG. 8A.

When any of the campaign information icons 50 is operated (tapped) on the quest screen of the normal quest in FIG. 6A, a campaign pop-up 32a shown in FIG. 7C is displayed on the display 26. Detailed information concerning the currently running campaigns is displayed in the campaign pop-up 32a.

Figure 9A:
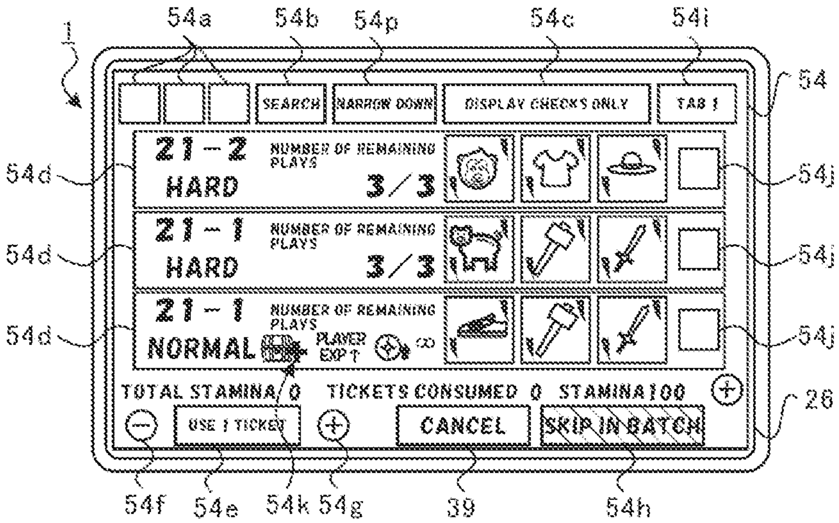
FIGS. 9A, 9B, and 9C are diagrams for illustrating examples of a quest list pop-up.

FIGS. 9A, 9B, 9C, 10A, and 10B are diagrams for illustrating examples of a quest list pop-up 54. FIG. 10C is a diagram for illustrating an example of a skip result pop-up 55.

As described above, the normal quest and the hard quest are implemented so that when the player consumes a ticket, a battle game in which three stars have been earned as the clear information is treated as if cleared by omitting at least a portion thereof. This allows the player to earn a desired item soon and easily.

However, players have been obliged to take a lot of time and effort to select one battle game that could grant a desired reward and earn the item by consuming a ticket in the selected battle game.

Therefore, in this embodiment, the player can treat multiple battle games as if they were cleared collectively by consuming tickets for the multiple battle games collectively and thus can earn a plurality of items at a time that can be earned in those battle games. More specifically, when the quest-list operation section 43 is operated (tapped) on the quest screen shown in FIG. 6A and FIG. 8A, the quest list pop-up 54 shown in FIG. 9A is displayed on the display 26.

In the quest list pop-up 54, three item selection boxes 54a, a search operation section 54b, a display-switch operation section 54c, and a narrow-down operation section 54p are displayed in the upper section. Furthermore, one or more battle game display regions 54d are displayed in the center of the quest list pop-up 54. In the quest list pop-up 54, total stamina, tickets consumed, and current stamina are also displayed below the battle game display regions 54d. Note that an icon (operation section) used to display, on the display 26, a pop-up for restoring stamina is provided to the right of the current stamina. The player can operate (tap) this icon and spend, for example, the second currency according to the indication in the pop-up displayed on the display 26, thereby restoring a predetermined amount of stamina. At this time, stamina can be restored beyond the upper limit value.

Furthermore, a ticket-number display box 54e, a minus operation section 54f, a plus operation section 54g, the cancel operation section 39, and a batch skip operation section 54h are displayed in the quest list pop-up 54. In addition, in the quest list pop-up 54, a tab-name display box 54i is displayed to the right of the display-switch operation section 54c. Although a detailed explanation is omitted, when the tab-name display box 54i is operated, any one of a plurality of tab names can be selected. In this embodiment, information set by the player is stored in the storage units 18 and 118 in association with each tab. The next time the quest list pop-up 54 is displayed, the quest list pop-up 54 appears on the basis of the stored information.

The item selection boxes 54*a* are initially blank, indicating that no items are selected. In this state, the battle game display regions 54*d* display battle games with three stars earned as clear information, in order of difficulty from top (high difficulty) to bottom (low difficulty). In addition, in each of the battle game display regions 54*d*, the number of remaining plays for the battle game and items that can be earned in that battle game are displayed, together with a check input box 54*j*.

In addition, in each of the battle game display regions 54*d*, icons that allow the player to identify information concerning the currently running campaigns are displayed. As described above, three types of campaigns are running in the normal quest in this embodiment, and three types of campaign information icons 54*k* according to the respective types of running campaigns are displayed in the battle game display regions 54*d* corresponding to the normal quest.

When any of the displayed campaign information icons 54*k* is operated (tapped), the campaign pop-up 32*a* similar to the one shown in FIG. 7C is displayed on the display 26.

Figure 9B:
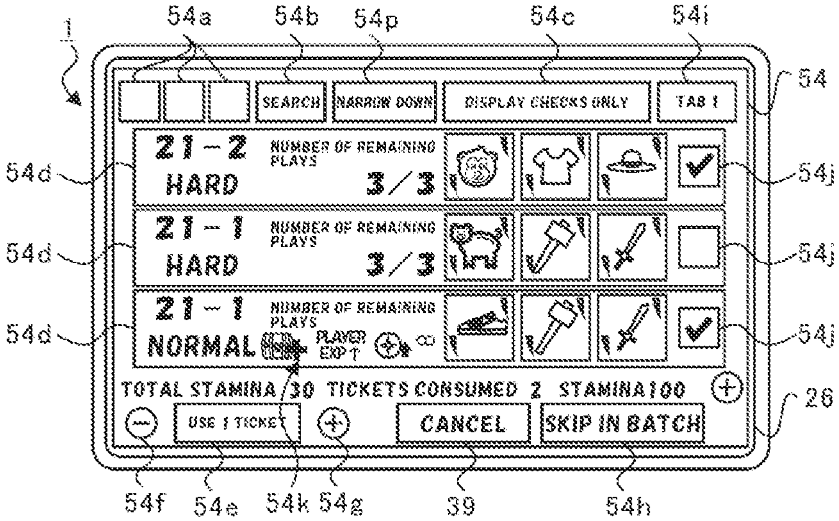

The check input boxes 54*j* can be checked, as shown in FIG. 9B, when operated (tapped) by the player. A check input box 54*j* with a check mark can be unchecked when operated (tapped) again.

Figure 9C:
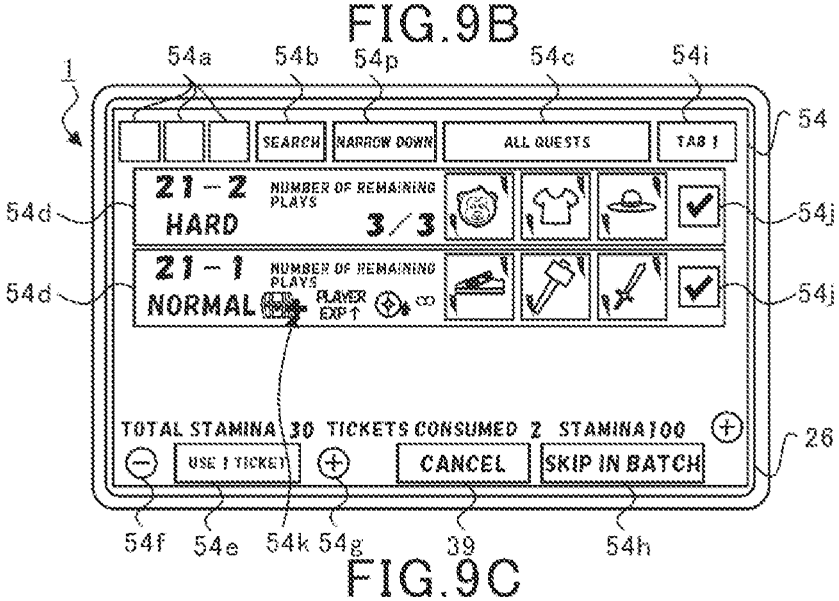

When the display-switch operation section 54*c* is operated (tapped) with a check mark placed in one or more check input boxes 54*j*, the battle game display regions 54*d* of only the battle games having a check mark in the check input boxes 54*j* are displayed in the quest list pop-up 54, as shown in FIG. 9C. When the display-switch operation section 54*c* is operated (tapped) again, the battle game display regions 54*d* of the battle games, including those having no check marks in the check input boxes 54*j*, are displayed in the quest list pop-up 54.

When one or more check input boxes 54*j* are checked as shown in FIGS. 9B and 9C, the stamina required to execute the checked battle games is displayed in the total stamina. In addition, the number of tickets required to execute the checked battle games is displayed as the tickets consumed.

Figure 10A:
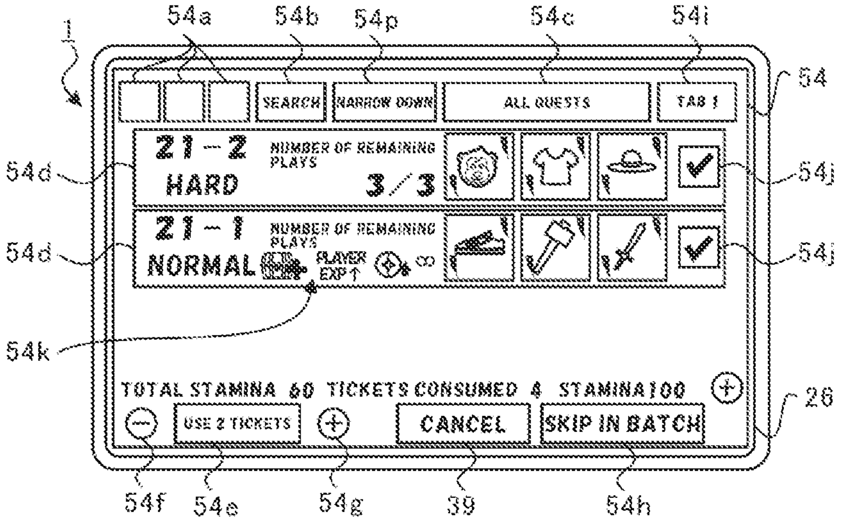
FIGS. 10A and 10B are diagrams for illustrating examples of a quest list pop-up.

Also, for example, when the plus operation section 54*g* is operated once in the quest list pop-up 54 shown in FIG. 9C, "Use 2 tickets" appears in the ticket-number display box 54*e*, as shown in FIG. 10A. In addition, the stamina required to execute each of the checked battle games twice is displayed in the total stamina, and the number of tickets required to execute each of the checked battle games twice is displayed as the tickets consumed. Also, each time the plus operation section 54*g* is operated, the number of tickets displayed in the ticket-number display box 54*e* is increased one by one, and the total stamina and the number of tickets consumed are increased, accordingly.

Figure 10B:
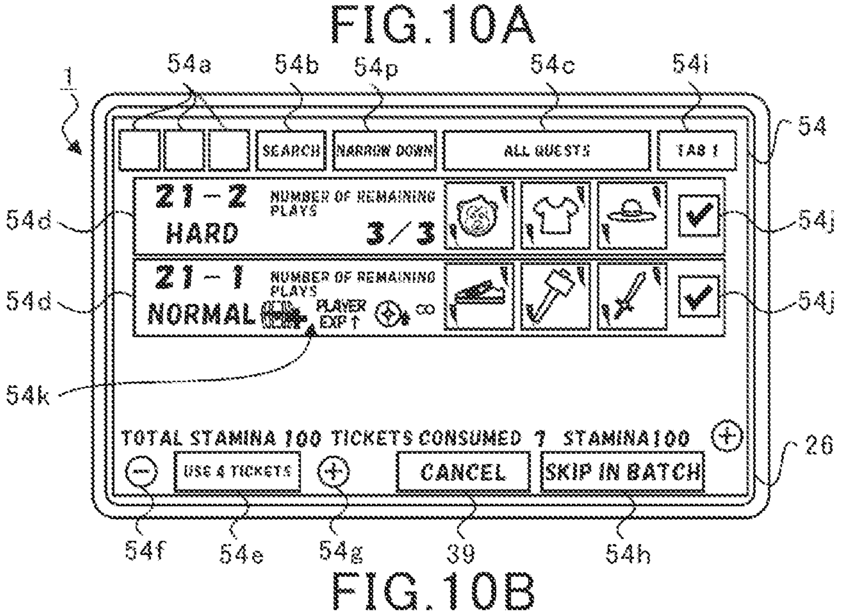
Figure 10C:
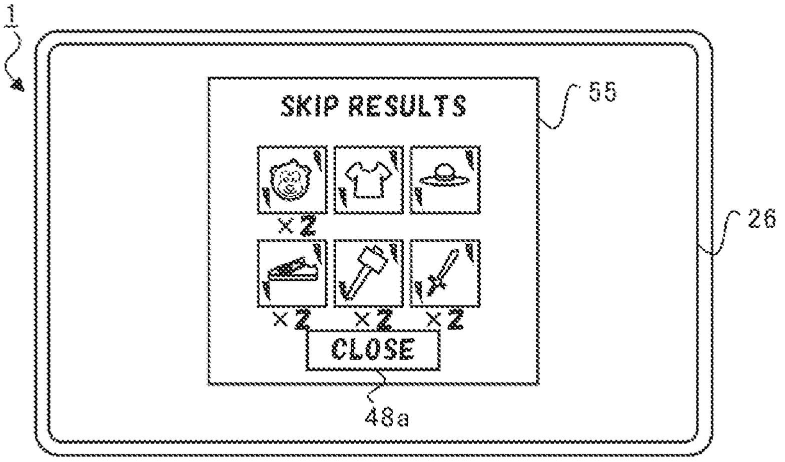
FIG. 10C is a diagram for illustrating an example of a skip result pop-up.

However, if the number of remaining plays for a battle game of the hard quest is less than the number of tickets displayed in the ticket-number display box 54*e*, the stamina corresponding only to the number of remaining plays for the battle game of the hard quest is added to the total stamina, and the tickets corresponding only to the remaining number of plays for the battle game of the hard quest are added to the tickets consumed. For example, if "Use 4 tickets" is displayed in the ticket-number display box 54*e* as shown in FIG. 10B, the stamina and consumed tickets worth of four plays of the "21-1" battle game of the normal quest (40 stamina, four tickets consumed) and the stamina and consumed tickets worth of three plays of the "21-2" battle game of the hard quest (60 stamina, three tickets consumed) are totaled, and the totals are displayed in the total stamina (100) and tickets consumed (7), respectively.

Also, each time the minus operation section 54*f* is operated, the number of tickets displayed in the ticket-number display box 54*e* is decreased one by one, and the total stamina and the number of tickets consumed are decreased, accordingly.

Thereafter, for example, when the batch skip operation section 54*h* is operated (tapped) while the quest list pop-up 54 shown in FIG. 10A is displayed, each of the "21-2" battle game of the hard quest and the "21-1" battle game of the normal quest is treated as if cleared twice, resulting in the display of the skip result pop-up 55 shown in FIG. 10C on the display 26. Items that have been earned as a result of two plays of the "21-2" battle game of the hard quest and two plays of the "21-1" battle game of the normal quest are displayed collectively in the skip result pop-up 55. The process of skipping multiple battle games together in this manner is called a batch skip process.

Figure 11A:
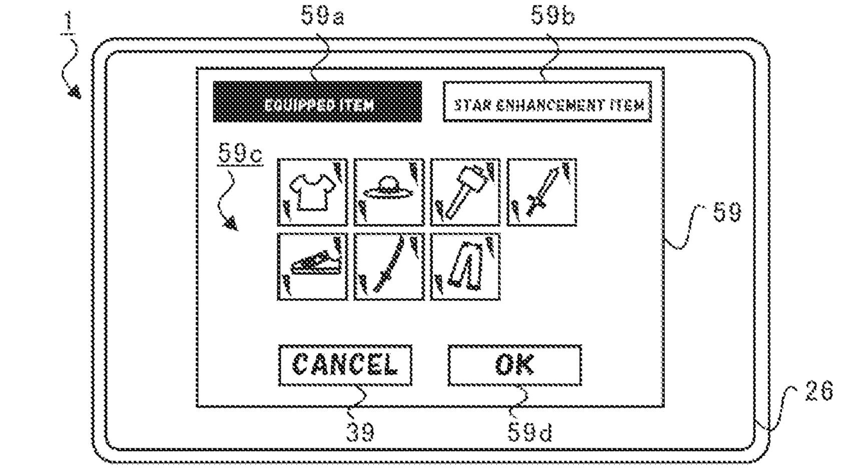
FIG. 11A is a diagram for illustrating an example of an item selection pop-up.
Figure 11B:
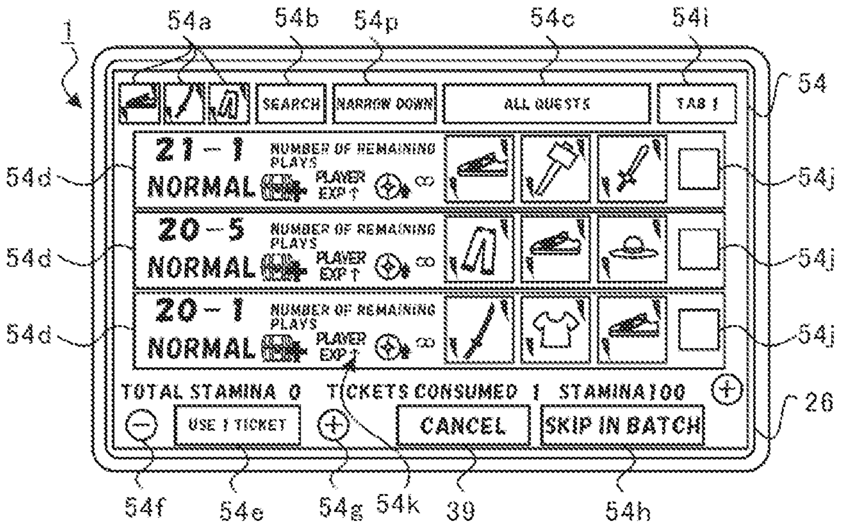
FIG. 11B is a diagram for illustrating an example of a quest list pop-up.

Next, the item selection boxes 54*a* and the search operation section 54*b* are described. FIG. 11A is a diagram for illustrating an example of an item selection pop-up 59. FIG. 11B is a diagram for illustrating an example of the quest list pop-up 54.

For example, when one of the item selection boxes 54*a* is operated (tapped) while the quest list pop-up 54 shown in FIG. 9A is displayed on the display 26, the item selection pop-up 59 shown in FIG. 11A is displayed on the display 26. An equipped-item selection operation section 59*a* and a star-enhancement-item selection operation section 59*b* are provided in the item selection pop-up 59. An item display region 59*c* for displaying items are also displayed in the item selection pop-up 59. In addition, the cancel operation section 39 and a selection-completion operation section 59*d* are provided in the item selection pop-up 59.

One of the equipped-item selection operation section 59*a* and the star-enhancement-item selection operation section 59*b* is selected. In the case where the equipped-item selection operation section 59*a* is selected, the item display region 59*c* lists items that can be earned in battle games in which three stars have been earned and that are needed to create equipment. In addition, in the case where the star-enhancement-item selection operation section 59*b* is selected, the item display region 59*c* lists items that can be earned in battle games in which three stars have been earned and that are needed to enhance the stars.

Players can select up to three items by operating (tapping) an item displayed in the item display region 59*c*. When the selection-completion operation section 59*d* is operated with items displayed in the item display region 59*c* being selected, the items selected in the item display region 59*c* are displayed in the item selection boxes 54*a*, as shown in FIG. 11B. Also, when the search operation section 54*b* is operated (tapped) with the items being displayed in the item selection boxes 54*a*, the battle game display regions 54*d* of battle games that allow the player to earn the items displayed in the item selection boxes 54*a* appear.

In this way, the player can display, in the battle game display regions 54*d*, a list of battle games that allow the player to earn desired items merely by selecting the desired items and operating (tapping) the search operation section 54*b*. Then, by simply placing a check mark in the check input boxes 54*j* for one or more battle games to be skipped and selecting the number of times each of the battle games is played, the player can collectively skip the selected number of plays of each of the battle games with a check mark in the check input boxes 54*j*. This facilitates item collection, saving the player time and effort.

Figure 12A:
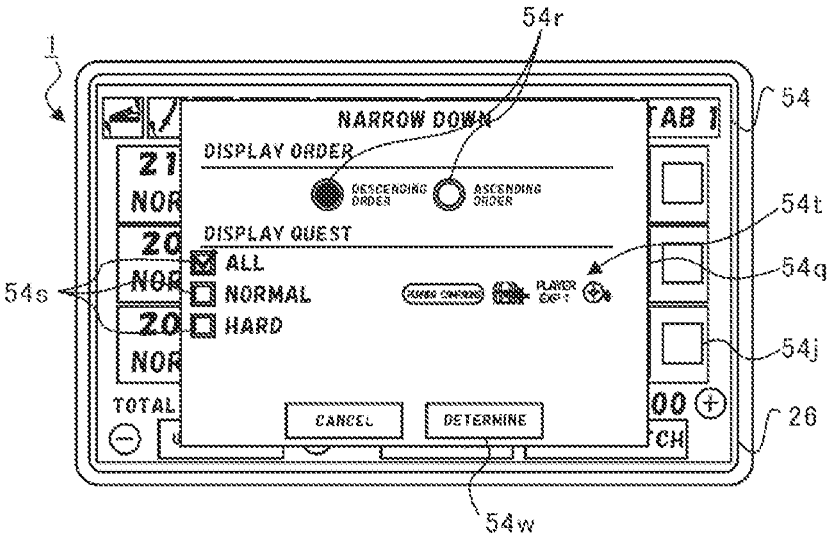
FIGS. 12A and 12B are diagrams for illustrating examples of a narrow-down pop-up.
Figure 12B:
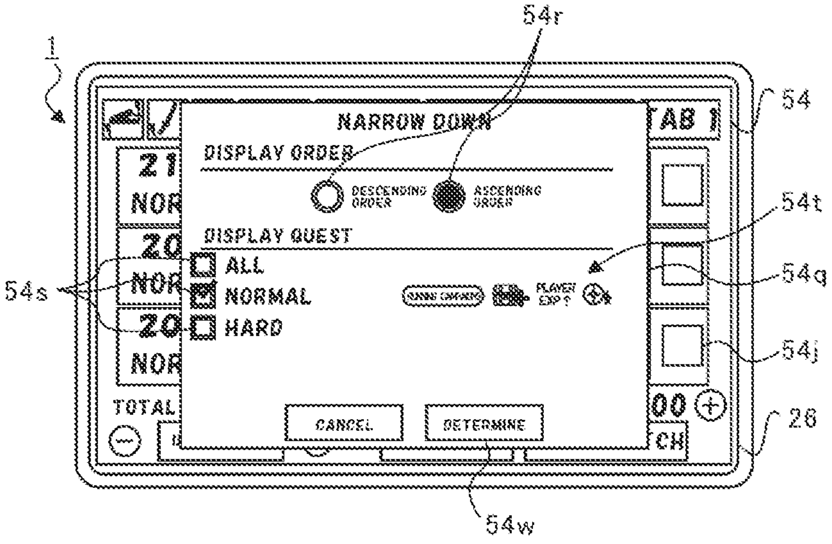

Next, the narrow-down operation section 54*p* is described. FIGS. 12A and 12B are diagrams for illustrating examples of a narrow-down pop-up 54*q*. For example, when the narrow-down operation section 54*p* is operated (tapped) while the quest list pop-up 54 shown in FIG. 11B is displayed on the display 26, the narrow-down pop-up 54*q* shown in FIG. 12A is displayed on the display 26. Display-order-change operation sections 54*r* for changing the display order of the quests displayed in the quest list pop-up 54 and display-quest operation sections 54*s* for changing the type of the quest to be displayed in the quest list pop-up 54 are displayed in the narrow-down pop-up 54*q*. In addition, in this embodiment, three types of campaigns are running in the normal quest as described above, and three types of campaign information icons 54*t* according to the types of running campaigns are displayed in the display-quest operation section 54*s* corresponding to the normal quest in the narrow-down pop-up 54*q*.

Also, when any of the displayed campaign information icons 54*t* is operated (tapped), the campaign pop-up 32*a* similar to the one shown in FIG. 7C is displayed on the display 26.

The display-order-change operation sections 54*r* and the display-quest operation sections 54*s* can be selected by a player operation (tapping). Also, when a determination operation section 54*w*, captioned "Determination" and displayed at the bottom of the narrow-down pop-up 54*q*, is operated, the quest list pop-up 54 will be displayed according to the conditions entered in the display-order-change operation sections 54*r* and the display-quest operation sections 54*s*.

Figure 13:
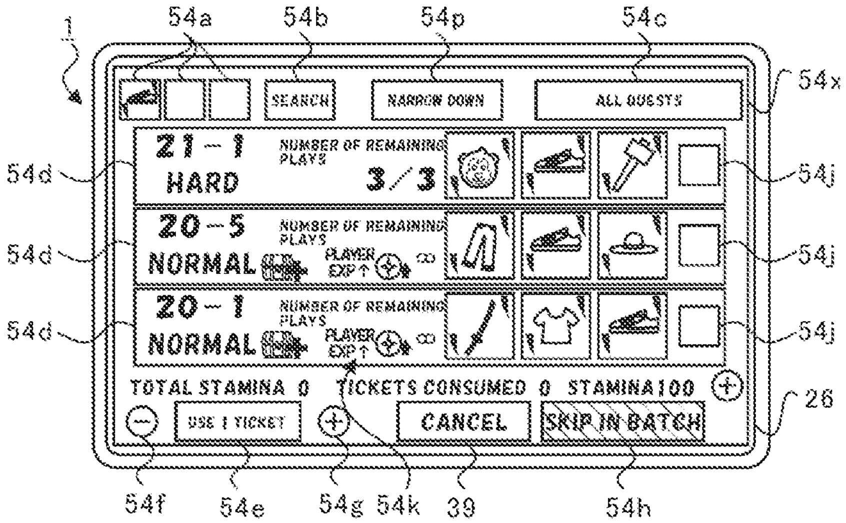
FIG. 13 is a diagram for illustrating an example of a quest list pop-up.

FIG. 13 is a diagram for illustrating an example of a quest list pop-up 54*x*. When the skip operation section 40*a* in an acquisition location pop-up 40 in FIGS. 4B, 5A, and 5C is operated (tapped), the quest list pop-up 54*x* shown in FIG. 13 is displayed on the display 26. The quest list pop-up 54*x* is different from the aforementioned quest list pop-up 54 in FIG. 9A in that the tab-name display box 54*i* is hidden. In addition, when the quest list pop-up 54 is displayed as a result of the skip operation section 40*a* being operated in an acquisition location pop-up 40 in FIGS. 4B, 5A, and 5C, an item selection box 54*a* initially appears so as to show the item that was displayed in the acquisition location pop-up 40. Also, the battle game display regions 54*d* of battle games that allow the player to earn the item displayed in the item selection box 54*a* appear.

More specifically, in order to display a battle game that allows the player to earn a desired item, the player needs to make a search by operating the search operation section 54*b* in the case of the aforementioned quest list pop-up 54 in FIG. 9A. On the other hand, when the skip operation section 40*a* in each of the acquisition location pop-ups 40 in FIGS. 4B, 5A, and 5C is operated (tapped), the quest list pop-up 54*x* shown in FIG. 13 appears with an item desired by the player being already found. This facilitates item collection, further saving the player time and effort. In other words, the player can specify a desired reward (item) by operating the skip operation section 40*a* in each of the acquisition location pop-ups (reward specifying screens) 40 in FIGS. 4B, 5A, and 5C, and the quest list pop-up 54*x* appears with this specified, predetermined reward (item) being displayed (found) in an item selection box 54*a*.

FIG. 14 is a diagram for illustrating an example of a campaign information table. The campaign information table is a table that is referenced when the campaign information icons 50 in FIG. 6A, the campaign pop-up 32*a* in FIG. 7C, the campaign information icons 54*k* in FIG. 9A, and the campaign information icons 54*t* in FIG. 12A, described above, are to be displayed. The campaign information table is stored in the storage unit 18 of the player terminal 1 and the storage unit 118 of the server 100. The campaign information table is downloaded from the server 100 to the player terminal 1 and updated at the time of login.

As shown in FIG. 14, in the campaign information table, whether or not campaigns are running is managed using a flag of 1 or 0 for each of the quest types. A flag value of 0 indicates that the campaign is not running in the corresponding quest type. A flag value of 1 indicates that the campaign is running in the corresponding quest type. This embodiment has been described by way of an example in which a maximum of three types of campaigns can be run, as shown in FIG. 14, but the content of campaigns and the number of campaigns that can be run simultaneously are not particularly limited.

Also, the player terminal 1 displays the campaign information icons 50 on a quest display screen shown in FIG. 6A by referring to the campaign information table. Also, the player terminal 1 displays the campaign information icons 54*k* in the quest list pop-up 54 shown in FIG. 9A by referring to the campaign information table. Also, the player terminal 1 displays the campaign information icons 54*t* in the narrow-down pop-up 54*q* shown in FIG. 12A by referring to the campaign information table. Also, the player terminal 1 displays the campaign information icons 54*k* in the quest list pop-up 54*x* shown in FIG. 13 by referring to the campaign information table. Also, the player terminal 1 displays the campaign pop-up 32*a* shown in FIG. 7C by referring to the campaign information table. Also, in addition to the content of the campaigns, the campaign information table may include information regarding a campaign running period. In this case, when displaying the campaign information icons 50, 54*k*, and 54*t* and displaying the campaign pop-up 32*a* by referring to the campaign information table, the player terminal 1 may display information regarding the campaign running periods in addition to the content of the campaigns. When displaying information regarding a campaign running period, the player terminal 1 may display, for example, the remaining time until the end of the running campaign or the time when the running campaign ends.

In addition, when a battle game is cleared or skipped, the server 100 refers to the campaign information table to determine and grant an additional reward on the basis of items that are granted to the player.

Next, the basic configurations and communication processing of the player terminal 1 and the server 100 for executing the batch skip process will be described. Here, basic communication processing for proceeding with the game and an example of main communication processing related to the batch skip process will be described, and other processes will be omitted.

(Functional Configuration of Player Terminal 1)

Figure 15:
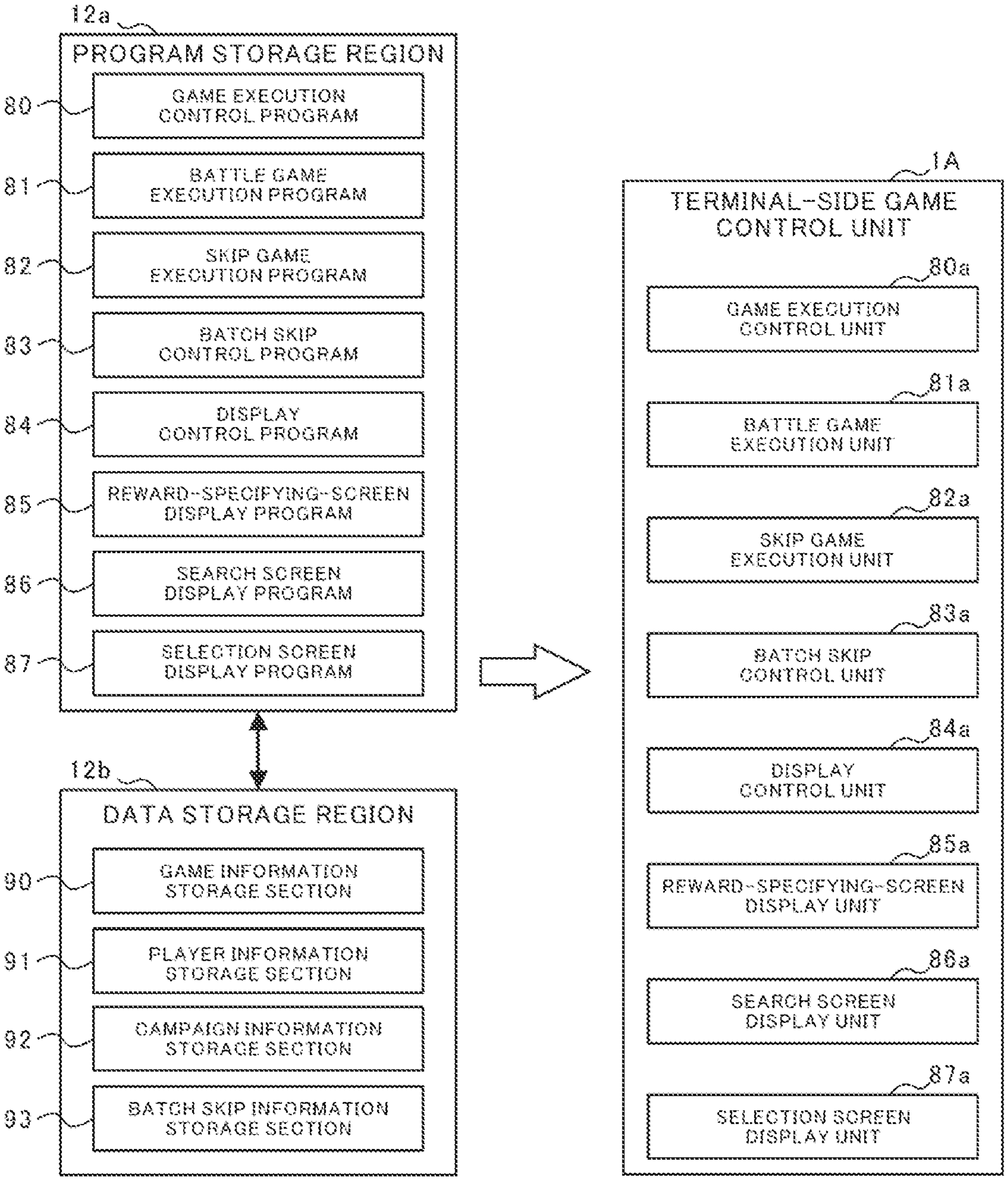
FIG. 15 is a diagram for illustrating the memory configuration and computer functions of a player terminal.

FIG. 15 is a diagram for illustrating the configuration of the memory 12 in the player terminal 1 and functions of the player terminal 1 as a computer. A program storage region 12*a* and a data storage region 12*b* are provided in the memory 12. When a game is started, the CPU 10 stores terminal-side game control programs (module) in the program storage region 12*a*.

The terminal-side game control programs include: a game execution control program 80; a battle game execution program 81; a skip game execution program 82; a batch skip control program 83; a display control program 84; a reward-specifying-screen display program 85; a search screen display program 86; and a selection screen display program 87. The programs listed in FIG. 15 are examples, and many other programs are provided as the terminal-side game control programs.

In the data storage region 12*b*, a game information storage section 90, a player information storage section 91, a campaign information storage section 92, and a batch skip information storage section 93 are provided as storage sections for storing data. Each of the above storage sections is an example, and many other storage sections are provided in the data storage region 12*b*.

The CPU 10 operates the programs stored in the program storage region 12*a* and updates data in each of the storage sections in the data storage region 12*b*. Also, the CPU 10 causes the player terminal 1 (computer) to function as a terminal-side game control unit 1A by operating the programs stored in the program storage region 12*a*. The terminal-side game control unit 1A includes: a game execution control unit 80*a*; a battle game execution unit 81*a*; a skip game execution unit 82*a*; a batch skip control unit 83*a*; a display control unit 84*a*; a reward-specifying-screen display unit 85*a*; a search screen display unit 86*a*; and a selection screen display unit 87*a*.

More specifically, the CPU 10 causes the computer to function as the game execution control unit 80*a* by running the game execution control program 80. Similarly, the CPU 10 causes the computer to function as the battle game execution unit 81*a*, the skip game execution unit 82*a*, the batch skip control unit 83*a*, the display control unit 84*a*, the reward-specifying-screen display unit 85*a*, the search screen display unit 86*a*, and the selection screen display unit 87*a* by running the battle game execution program 81, the skip game execution program 82, the batch skip control program 83, the display control program 84, the reward-specifying-screen display program 85, the search screen display program 86, and the selection screen display program 87, respectively.

The game execution control unit 80*a* controls the progress of the entire game. For example, the game execution control unit 80*a* transmits login information to the server 100 when a login is performed. The game execution control unit 80*a* also performs control related to the transition of the normal screens. Also, the game execution control unit 80*a* receives game information from the server 100 when the game information of the game in general is updated and stores the game information in the game information storage section 90.

The battle game execution unit 81*a* is responsible for controlling the execution of battle games. For example, the battle game execution unit 81*a* updates the battle screen, controls the movements of ally characters and enemy characters, and derives damage points on the basis of operations input to the player terminal 1.

The skip game execution unit 82*a* is responsible for control when a battle game is skipped by consuming a ticket.

The batch skip control unit 83*a* stores information concerning the batch skip process in the batch skip information storage section 93 and is responsible for control related to the batch skip process.

The display control unit 84*a* generates a screen to be displayed on the display 26 and displays the generated screen on the display 26.

The reward-specifying-screen display unit 85*a* displays the acquisition location pop-ups (reward specifying screens) 40 in FIGS. 4B, 5A, and 5C on the basis of a player operation. In other words, the reward-specifying-screen display unit 85*a* displays a reward specifying screen that allows the player to specify a desired reward (item) and also displays a game in which the player can earn the reward (item) that can be specified on the reward specifying screen.

The search screen display unit 86*a* displays the item selection pop-up (search screen) 59 in FIG. 11A on the basis of a player operation. In other words, the search screen display unit 86*a* displays a search screen that allows the player to specify a desired reward.

The selection screen display unit 87*a* displays the narrow-down pop-up (group selection screen) 54*q* on the basis of a player operation. In other words, the selection screen display unit 87*a* displays a group selection screen that allows the player to select at least one of a plurality of predetermined groups (normal quest, hard quest). At this time, the selection screen display unit 87*a* refers to the campaign information table stored in the campaign information storage section 92 and displays, in the display-quest operation section 54*s* corresponding to a quest with running campaigns, the campaign information icons (additional information) 54*t* corresponding to the types of the running campaigns. In other words, the display control unit 84*a* adds additional information to a group to which an advantageously conditioned game belongs and displays the additional information.

(Functional Configuration of Server 100)

Figure 16:
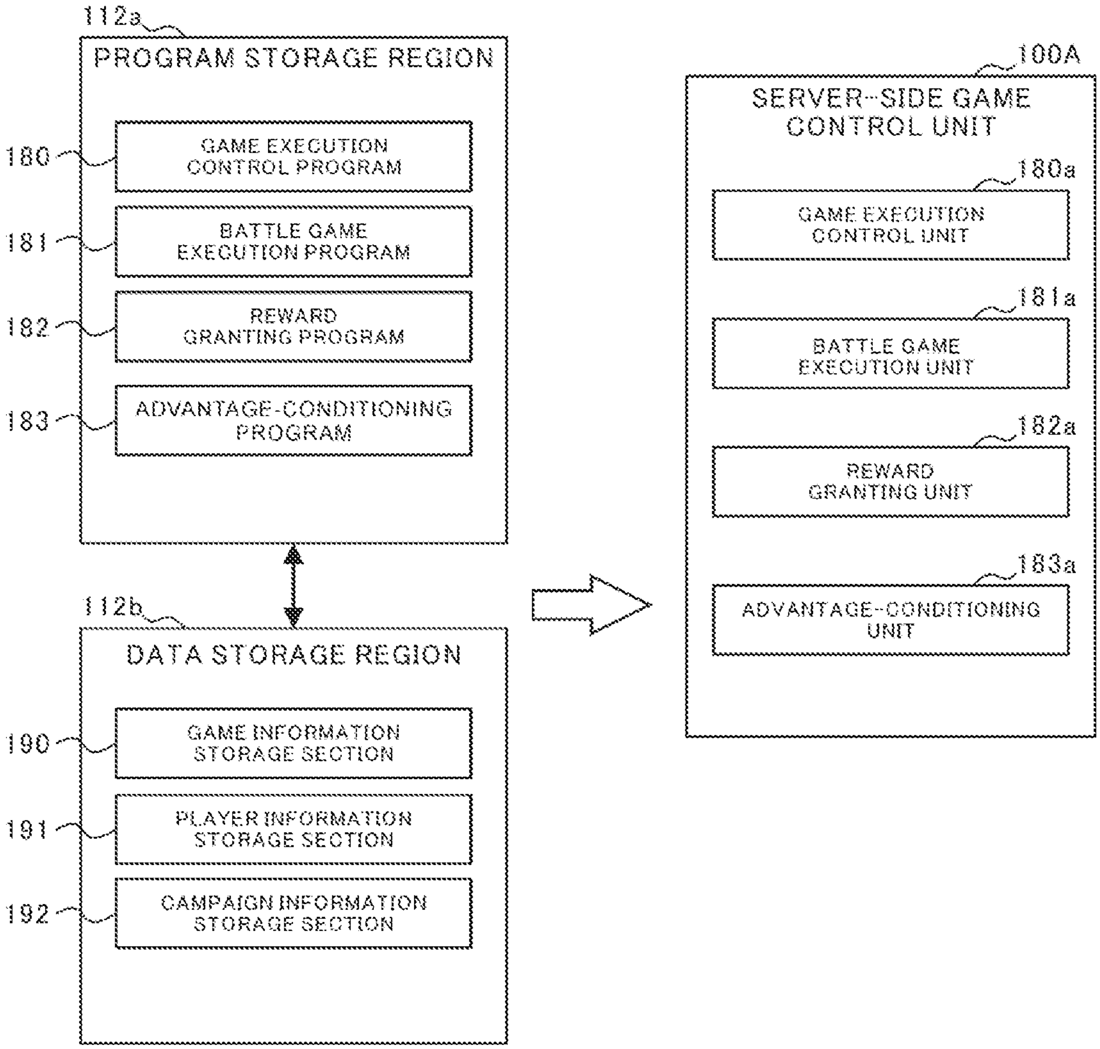
FIG. 16 is a diagram for illustrating the memory configuration and computer functions of a server.

FIG. 16 is a diagram for illustrating the configuration of the memory 112 in the server 100 and functions of the server 100 as a computer. A program storage region 112*a* and a data storage region 112*b* are provided in the memory 112. When a game is started, the CPU 110 stores server-side game control programs (module) in the program storage region 112*a*.

The server-side game control programs include: a game execution control program 180; a battle game execution program 181; a reward granting program 182; and an advantage-conditioning program 183. The programs listed in FIG. 16 are examples, and many other programs are provided as the server-side game control programs.

In the data storage region 112*b*, a game information storage section 190, a player information storage section 191, and a campaign information storage section 192 are provided as storage sections for storing data. Each of the above storage sections is an example, and many other storage sections are provided in the data storage region 112*b*.

The CPU 110 operates the programs stored in the program storage region 112*a* and updates data in each of the storage sections in the data storage region 112*b*. Also, the CPU 110 causes the server 100 to function as a server-side game control unit 100A by running the programs stored in the program storage region 112*a*. The server-side game control unit 100A includes a game execution control unit 180*a*, a battle game execution unit 181*a*, reward granting unit 182*a*, and an advantage-conditioning unit 183*a*.

More specifically, the CPU 110 causes the computer to function as the game execution control unit 180*a* by running the game execution control program 180. Similarly, the CPU 110 causes the computer to function as the battle game execution unit 181*a*, the reward granting unit 182*a*, and the advantage-conditioning unit 183*a* by running the battle game execution program 181, the reward granting program 182, and the advantage-conditioning program 183, respectively.

The game execution control unit 180*a* controls the progress of the entire game. For example, upon receiving login information from the player terminal 1, the game execution control unit 180*a* transmits the player information stored in the player information storage section 191 to the player terminal 1. Also, when the game information of the game in general is updated, the game execution control unit 180*a* reads the updated game information from the game information storage section 190 and transmits the updated game information to the player terminal 1.

The battle game execution unit 181*a* is responsible for control to execute battle games.

The reward granting unit 182*a* grants rewards to players. The reward granting unit 182*a* grants an item corresponding to a cleared battle game to a player who has cleared the battle game. More specifically, the reward granting unit 182*a* adds the granted item to the player information corresponding to the player ID of the player who has cleared the battle game and stores the player information in the player information storage section 191.

The advantage-conditioning unit 183*a* refers to the campaign information storage section 192 and, if a campaign is running, determines an additional reward on the basis of the reward determined by the reward granting unit 182*a* and grants the additional reward. In other words, the reward granting unit 182*a* grants at least some battle games a condition advantageous to the player.

(Communication Process Between Player Terminal 1 and Server 100)

Figure 17:
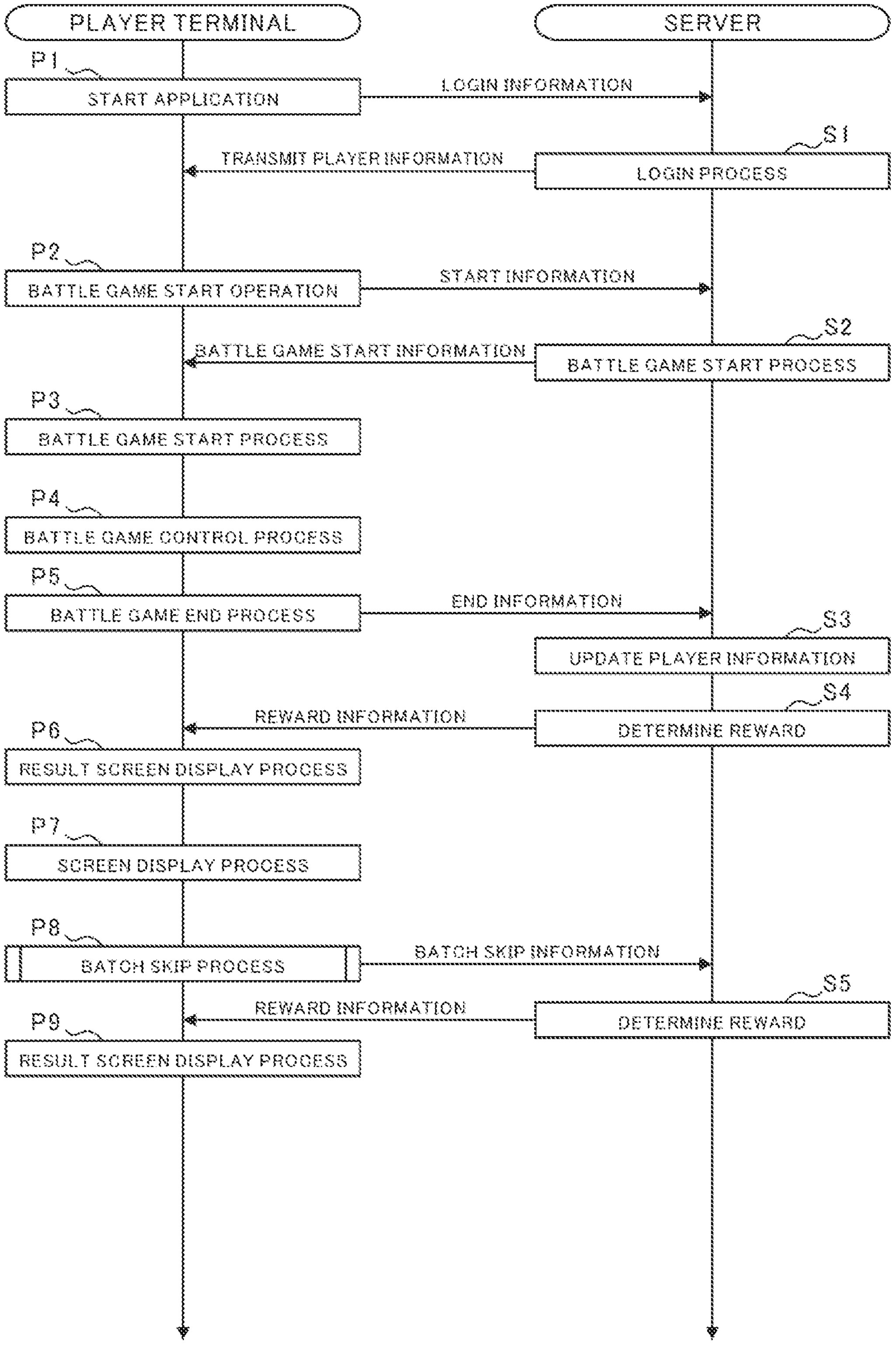
FIG. 17 is a sequence diagram for illustrating basic processing of a player terminal and a server.

FIG. 17 is a sequence diagram for illustrating basic processes of the player terminal 1 and the server 100. Note that, in the following description, processes in the player terminal 1 are denoted as Pn (n is any integer). Furthermore, processes in the server 100 are denoted as Sn (n is any integer). When the player starts the game application on the player terminal 1 (P1), the game execution control unit 80*a* transmits login information to the server 100. Upon receiving the login information, the game execution control unit 180*a* of the server 100 identifies the player ID associated with the login information and executes a login process (S1). Here, the game execution control unit 180*a* reads, from the player information storage section 191, the player information corresponding to the identified player ID and transmits the player information to the player terminal 1.

In addition, it is assumed that an operation for staring the battle game has been performed on the player terminal 1 (P2). In this case, start information is transmitted from the player terminal 1 to the server 100. Note that this start information includes party information, type information of the battle game, etc. selected by the player. As a result of the start information being input thereto, the server 100 transmits, to the player terminal 1, battle game start information required to start the battle game (S2). Then, upon receiving the battle game start information, the battle game execution unit 81*a* of the player terminal 1 executes a battle game start process for starting the battle game (P3). Here, the player terminal 1, for example, allocates an area in the memory 12 for proceeding with the battle game, reads predetermined programs into the memory 12 from the storage unit 18, etc.

Thereafter, the battle game execution unit 81*a* of the player terminal 1 executes a battle game control process for controlling the battle game (P4). In this battle game control process, an update process for updating various types of information is repeatedly executed frame by frame. Note that the number of frames is not particularly limited. For example, the number of frames per second is 30 to 60. Therefore, during the battle game, information is updated roughly every 16 ms (millisecond) to 33 ms in the player terminal 1.

Then, when the end conditions of the battle game are met, the battle game execution unit 81*a* of the player terminal 1 executes a battle game end process for ending the battle game (P5). In the battle game end process, for example, game result information is transmitted to the server 100. Upon acquiring the game result information, the battle game execution unit 181*a* of the server 100 updates the player information (S3). Note that when the battle game has been started using a ticket, the skip game execution unit 82*a* skips the battle game start process (P3) and the battle game control process (P4), thereby treating the battle game as if cleared, and then executes the battle game end process (P5).

In addition, if the battle game has been cleared on the basis of the game result information, the reward granting unit 182*a* determines an item corresponding to the cleared battle game and grants the item (S4). Also, the reward granting unit 182*a* transmits, to the player terminal 1, the information concerning the item to be granted as reward information. The display control unit 84*a* of the player terminal 1 displays the result screen on the display 26 on the basis of the reward information (P6).

In addition, the reward-specifying-screen display unit 85*a* displays the acquisition location pop-ups (reward specifying screens) 40 in FIGS. 4B, 5A, and 5C on the basis of a player operation (P7). In other words, the reward-specifying-screen display unit 85*a* displays a reward specifying screen that allows the player to specify a desired reward. In addition, on the basis of a player operation, the display control unit 84*a* displays a quest display screen including the quest-list operation section 43 shown in FIGS. 6A and 8A (P7).

Figure 18:
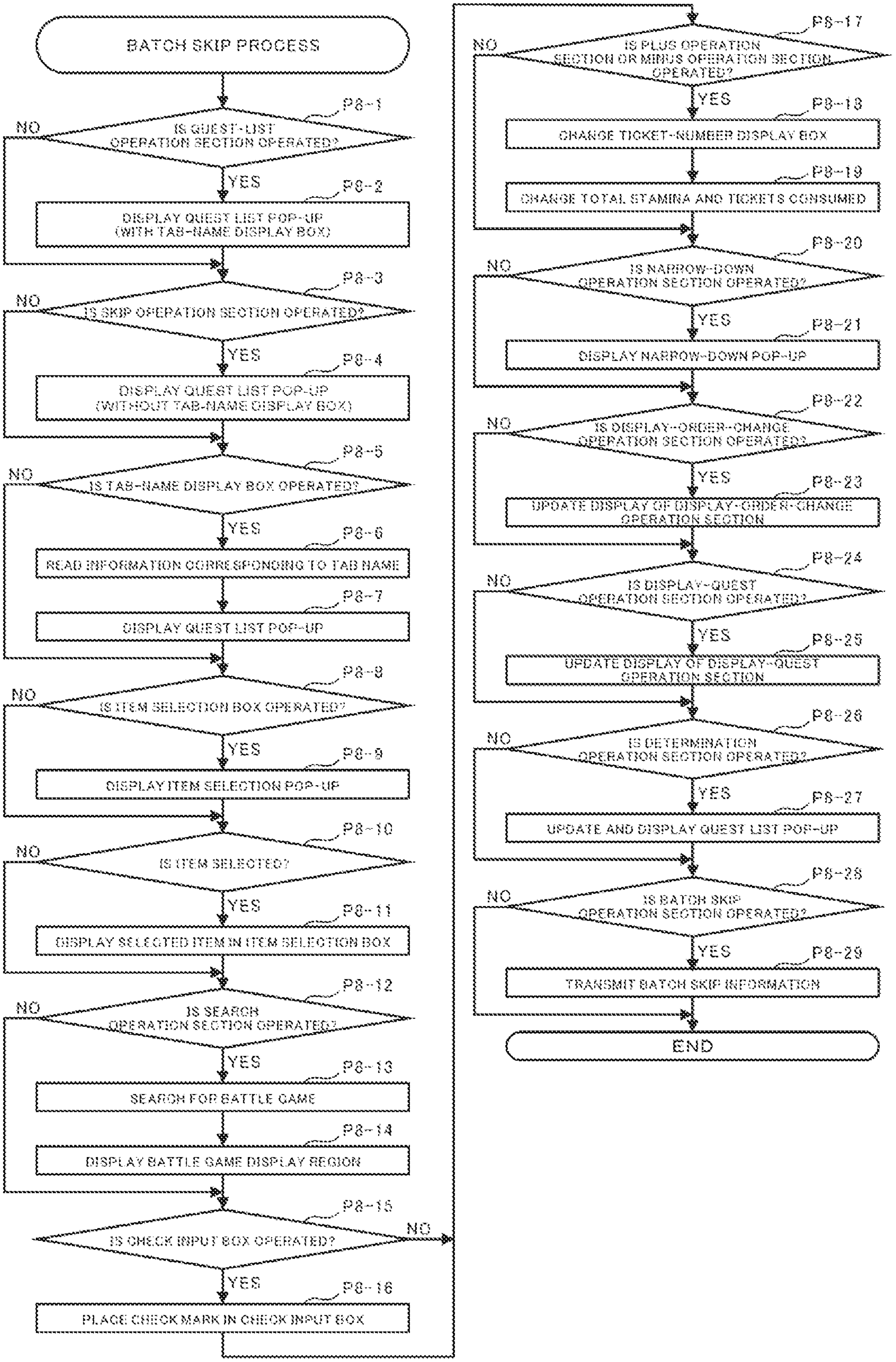
FIG. 18 is a flowchart for illustrating a batch skip process.

In addition, the terminal-side game control unit 1A executes the batch skip process (P8). FIG. 18 is a flowchart for illustrating the batch skip process. The batch skip control unit 83*a* determines whether or not the quest-list operation section 43 is operated (P8-1).

As a result, if the quest-list operation section 43 is operated on the quest display screen shown in FIGS. 6A and 8A (YES in P8-1), the display control unit 84*a* displays the quest list pop-up 54 in FIG. 9A on the display 26 (P8-2). At this time, the display control unit 84*a* displays the quest list pop-up 54 on the basis of various information stored in association with a tab name stored in the batch skip information storage section 93.

At this time, the display control unit 84*a* may display tab 1, or alternatively, the tab that was last displayed by the player in the quest list pop-up 54 may be stored in the batch skip information storage section 93, so that the display control unit 84*a* can display the tab that was last displayed by the player in the quest list pop-up 54. Alternatively, the display control unit 84*a* may display all item selection boxes 54*a* as blank in the quest list pop-up 54. In addition, the display control unit 84*a* refers to the campaign information storage section 92 and displays, in the battle game display region 54*d* corresponding to a quest with running campaigns, the campaign information icons (additional information) 54*k* corresponding to the types of the running campaigns.

In addition, if the quest-list operation section 43 is not operated (NO in P8-1), the batch skip control unit 83*a* determines whether or not the skip operation section 40*a* is operated (P8-3). As a result, if the skip operation section 40*a* in an acquisition location pop-up (reward specifying screen) 40 in FIGS. 4B, 5A, and 5C is operated (YES in P8-3), the display control unit 84*a* displays the quest list pop-up 54*x* shown in FIG. 13 on the display (P8-4).

At this time, in the quest list pop-up (skip selection screen) 54*x*, the display control unit 84*a* causes the item displayed in the acquisition location pop-up 40 to be displayed in an item selection box (predetermined region) 54*a* and displays the battle game display region 54*d* of a battle game that allows the player to earn the item displayed in the item selection box 54*a*. In other words, the first time the skip selection screen is displayed after a reward is specified on the reward specifying screen, the display control unit 84*a* identifiably displays, in a predetermined region, the reward specified on the reward specifying screen.

In addition, the display control unit 84*a* refers to the campaign information storage section 92 and displays, in the battle game display region 54*d* corresponding to a quest with running campaigns, the campaign information icons (additional information) 54*k* corresponding to the types of the running campaigns. In other words, the display control unit 84*a* displays additional information that allows an advantageously conditioned battle game to be identified.

When the tab-name display box 54*i* is operated (YES in P8-5), the batch skip control unit 83*a* reads the information corresponding to the operated tab name from the batch skip information storage section 93 (P8-6). The display control unit 84*a* displays the quest list pop-up 54 on the display 26 according to the read-out batch skip list (P8-7).

In addition, when any of the item selection boxes 54*a* is operated (tapped) (YES in P8-8), the display control unit 84*a* displays, on the display 26, the item selection pop-up 59 shown in FIG. 11A (P8-9). Then, when the selection-completion operation section 59*d* is operated while an item displayed in the item display region 59*c* is selected (YES in P8-10), the display control unit 84*a* displays, in the item selection box 54*a*, the item selected in the item display region 59*c* (P8-11). In addition, in the case where the quest list pop-up 54 is displayed, the batch skip control unit 83*a* stores, in the batch skip information storage section 93, the selected item in association with the tab name. At this time, the batch skip control unit 83*a* may not only store, in the batch skip information storage section 93, the selected item in association with the tab name but also transmit the information to the server 100.

The timing at which the batch skip control unit 83*a* stores the selected item in the batch skip information storage section 93 is not limited to this. For example, the batch skip control unit 83*a* may store the selected item in the batch skip information storage section 93 at the time the player operates the cancel operation section 39. Alternatively, the batch skip control unit 83*a* may store the selected item in the batch skip information storage section 93 at the time the player operates the batch skip operation section 54*h* or operates the tab-name display box 54*i*. On the other hand, in the case where the quest list pop-up 54*x* is displayed, the batch skip control unit 83*a* discards information concerning the selected item at the time the player operates the cancel operation section 39.

Thereafter, when the search operation section 54*b* is operated (tapped) (YES in P8-12), the batch skip control unit 83*a* searches for a battle game that allows the player to earn the item displayed in the item selection box 54*a* (P8-13). Then, the search screen display unit 86*a* displays the battle game display regions 54*d* of the found battle games (P8-14).

Also, when the check input box 54*j* of a battle game display region 54*d* is operated (YES in P8-15), the display control unit 84*a* places a check mark in the operated check input box 54*j* (P8-16). In addition, in the case where the quest list pop-up 54 is displayed, the batch skip control unit 83*a* stores, in the batch skip information storage section 93, the checked battle game in association with the tab name and transmits the information to the server 100.

Note that the timing at which the batch skip control unit 83*a* stores the checked battle game in the batch skip information storage section 93 and transmits the information to the server 100 is not limited to this. For example, at the time the player operates the cancel operation section 39, at the time the player operates the batch skip operation section 54*h*, or at the time the player operates the tab-name display box 54*i*, the batch skip control unit 83*a* may store the checked battle game in the batch skip information storage section 93 and transmit the information to the server 100. On the other hand, in the case where the quest list pop-up 54*x* is displayed, the batch skip control unit 83*a* discards information concerning the checked battle game at the time the player operates the cancel operation section 39.

In addition, when the minus operation section 54*f* and the plus operation section 54*g* are operated (YES in P8-17), the display control unit 84*a* changes the indication of the ticket-number display box 54*e* according to the operation (P8-18). In addition, the display control unit 84*a* changes and displays the total stamina and the number of tickets consumed according to the operation (P8-19). Also, in the case where the quest list pop-up 54 is displayed, the batch skip control unit 83*a* stores, in the batch skip information storage section 93, the changed number of tickets in association with the tab name and transmits the information to the server 100.

Note that the timing at which the batch skip control unit 83*a* stores the changed number of tickets in the batch skip information storage section 93 and transmits the information to the server 100 is not limited to this. For example, at the time the player operates the cancel operation section 39, at the time the player operates the batch skip operation section 54*h*, or at the time the player operates the tab-name display box 54*i*, the batch skip control unit 83*a* may store the changed number of tickets in the batch skip information storage section 93 and transmit the information to the server 100. On the other hand, in the case where the quest list pop-up 54*x* is displayed, the batch skip control unit 83*a* discards information concerning the changed number of tickets at the time the player operates the cancel operation section 39.

Also, when the narrow-down operation section 54*p* is operated (YES in P8-20), the selection screen display unit 87*a* displays the narrow-down pop-up (group selection screen) 54*q* (P8-21). In other words, the selection screen display unit 87*a* displays a group selection screen that allows the player to select at least one of a plurality of predetermined groups. At this time, the selection screen display unit 87*a* refers to the campaign information storage section 92 and displays, in the display-quest operation section 54*s* corresponding to a quest with running campaigns, the campaign information icons (additional information) 54*t* corresponding to the types of the running campaigns. In other words, the display control unit 84*a* adds additional information to a group to which an advantageously conditioned game belongs and displays the additional information.

In addition, when a display-order-change operation section 54*r* is operated (YES in P8-22), the selection screen display unit 87*a* updates the display of the narrow-down pop-up 54*q* (P8-23). In addition, when a display-quest operation section 54*s* is operated (YES in P8-24), the selection screen display unit 87*a* updates the display of the display-quest operation sections 54*s* (P8-25). Also, when the determination operation section 54*w* is operated (YES in P8-26), the display control unit 84*a* updates the display of the quest list pop-up 54 or the quest list pop-up 54*x* (P8-27). In other words, the display control unit 84*a* displays a plurality of games belonging to the group selected by the player in the narrow-down pop-up (group selection screen) 54*q*.

When the batch skip operation section 54*h* is operated (YES in P8-28), the batch skip control unit 83*a* transmits, to the server 100, batch skip information indicating the tiers of all battle games and the number of times each of the games is played (P8-29).

Referring back to FIG. 17, upon receiving the batch skip information, the reward granting unit 182*a* determines and grants, on the basis of the batch skip information, the same number of items as the number of times each of the battle games is played. Furthermore, the advantage-conditioning unit 183*a* refers to the campaign information storage section 192 and, if a campaign is running, determines an additional reward on the basis of the reward determined by the reward granting unit 182*a* and grants the additional reward (S5). Then, the reward granting unit 182*a* transmits, to the player terminal 1 as reward information, the information concerning the granted items determined by the reward granting unit 182*a* and the information concerning the granted item determined by the advantage-conditioning unit 183*a*. The display control unit 84*a* of the player terminal 1 displays the result screen on the display 26 on the basis of the reward information (P9).

As described above, the player terminal 1 includes: the game execution control program 80; the battle game execution program 81; the skip game execution program 82; the batch skip control program 83; the display control program 84; the reward-specifying-screen display program 85; the search screen display program 86; and the selection screen display program 87. In addition, the player terminal 1 includes: the game execution control unit 80*a*; the battle game execution unit 81*a*; the skip game execution unit 82*a*; the batch skip control unit 83*a*; the display control unit 84*a*; the reward-specifying-screen display unit 85*a*; the search screen display unit 86*a*; and the selection screen display unit 87*a*. However, some or all of these programs and functional units may be provided in the server 100.

In addition, the server 100 includes: the game execution control program 180; the battle game execution program 181; the reward granting program 182; and the advantage-conditioning program 183. In addition, the server 100 includes: the game execution control unit 180*a*; the battle game execution unit 181*a*; the reward granting unit 182*a*; and the advantage-conditioning unit 183*a*. However, some or all of these programs and functional units may be provided in the player terminal 1.

In addition, the programs in the above-described embodiment may be stored in a computer-readable storage medium, and may be provided in the form of a storage medium. Furthermore, those programs may be provided in the form of a player terminal or an information processing system including this storage medium. Furthermore, the embodiment described above may be an information processing method for realizing the functions and the steps shown in the flowcharts.

Although an aspect of an embodiment has been described with reference to the accompanying drawings, it goes without saying that the present invention is not limited to the embodiments described above. It would be obvious that a person skilled in the art could conceive of various modifications and amendments within the scope recited in the claims, and it will be understood that those modifications and amendments obviously belong to the technical scope of the present invention.

Note that the quest-list operation section 43 on each of the quest display screens shown in FIGS. 6A and 8A, as well as the skip operation section 40*a* in each of the acquisition location pop-ups (reward specifying screen) 40 shown in FIGS. 4B, 5A, and 5C, may be displayed when predetermined release conditions are met. The release conditions may be that a predetermined battle game has been cleared or that the player has reached a predetermined level. In other words, if the release conditions are not met, it is not necessary to display the quest-list operation section 43 on each of the quest display screens shown in FIGS. 6A and 8A, as well as the skip operation section 40*a* in each of the acquisition location pop-ups (reward specifying screen) 40 shown in FIGS. 4B, 5A, and 5C.

A first aspect according to the present disclosure of the present invention includes a non-transitory, computer-readable medium for storing an information processing program, and this program causes a computer to:

- execute a game on the basis of an operation performed by a player;
- grant a predetermined reward when the game is cleared;
- display a reward specifying screen on which the player can specify a desired reward;
- display a skip selection screen capable of displaying a plurality of the games that can each award the reward specified on the reward specifying screen and that can execute a skip process for omitting at least one function; and
- execute, by means of the skip process, a game selected from the plurality of games displayed on the skip selection screen,
- wherein the games each capable of awarding the reward that can be specified on the reward specifying screen are displayed.

In the first aspect, the program may cause the computer to display a search screen on which the player can specify at least one reward including the desired reward,

- wherein it may be possible to display a plurality of the games that can each award the at least one reward specified on the search screen and that can execute the skip process for omitting at least one function,
- the at least one reward specified on the search screen may be identifiably displayed in a predetermined region on the skip selection screen, and
- the reward specified on the reward specifying screen may be identifiably displayed in the predetermined region the first time the skip selection screen is displayed after the reward has been specified on the reward specifying screen.

In the first aspect, the program may cause the computer to assign at least one of the games a condition advantageous to the player,

- wherein additional information capable of identifying the at least one game assigned the advantageous condition may be displayed.

In the first aspect, the program may cause the computer to display a group selection screen on which the player can select at least one of a plurality of predetermined groups,

- wherein each of the games may belong to one of the plurality of groups,
- the advantageous condition may be assigned to the games, classified by the group, the additional information may be added to the group to which the at least one game assigned the advantageous condition belongs and displayed, and it may be possible to display the plurality of games belonging to the at least one group selected by the player on the group selection screen.

A second aspect of the present disclosure includes an information processing method executed by at least one of a player terminal and a server that can communicate with the player terminal, and this method includes:

executing a game on the basis of an operation performed by a player;

granting a predetermined reward when the game is cleared;

displaying a reward specifying screen on which the player can specify a desired reward;

displaying a skip selection screen capable of displaying a plurality of the games that can each award the reward specified on the reward specifying screen and that can execute a skip process for omitting at least one function; and executing, by means of the skip process, a game selected from the plurality of games displayed on the skip selection screen, wherein the games each capable of awarding the reward that can be specified on the reward specifying screen are displayed.

In the second aspect, the method may include:

displaying a search screen on which the player can specify at least one reward including the desired reward, wherein it may be possible to display a plurality of the games that can each award the at least one reward specified on the search screen and that can execute the skip process for omitting at least one function, the at least one reward specified on the search screen may be identifiably displayed in a predetermined region on the skip selection screen, and the reward specified on the reward specifying screen may be identifiably displayed in the predetermined region the first time the skip selection screen is displayed after the reward has been specified on the reward specifying screen.

In the second aspect, the method may include:

assigning at least one of the games a condition advantageous to the player, wherein additional information capable of identifying the at least one game assigned the advantageous condition may be displayed.

In the second aspect, the method may include:

displaying a group selection screen on which the player can select at least one of a plurality of predetermined groups, wherein each of the games may belong to one of the plurality of groups, the advantageous condition may be assigned to the games, classified by the group, the additional information may be added to the group to which the at least one game assigned the advantageous condition belongs and displayed, and it may be possible to display the plurality of games belonging to the at least one group selected by the player on the group selection screen.

A third aspect of the present disclosure includes an information processing system including a player terminal and a server that can communicate with the player terminal, and at least one of the player terminal and the server is configured to:

execute a game on the basis of an operation performed by a player;

grant a predetermined reward when the game is cleared;

display a reward specifying screen on which the player can specify a desired reward;

display a skip selection screen capable of displaying a plurality of the games that can each award the reward specified on the reward specifying screen and that can execute a skip process for omitting at least one function; and execute, by means of the skip process, a game selected from the plurality of games displayed on the skip selection screen, wherein the games each capable of awarding the reward that can be specified on the reward specifying screen are displayed.

In the third aspect, at least one of the player terminal and the server may be configured to:

display a search screen on which the player can specify at least one reward including the desired reward, wherein it may be possible to display a plurality of the games that can each award the at least one reward specified on the search screen and that can execute the skip process for omitting at least one function, the at least one reward specified on the search screen may be identifiably displayed in a predetermined region on the skip selection screen, and the reward specified on the reward specifying screen may be identifiably displayed in the predetermined region the first time the skip selection screen is displayed after the reward has been specified on the reward specifying screen.

In the third aspect, at least one of the player terminal and the server may be configured to:

assign at least one of the games a condition advantageous to the player, wherein additional information capable of identifying the at least one game assigned the advantageous condition may be displayed.

In the third aspect, at least one of the player terminal and the server may be configured to:

display a group selection screen on which the player can select at least one of a plurality of predetermined groups, wherein each of the games may belong to one of the plurality of groups, the advantageous condition may be assigned to the games, classified by the group, the additional information may be added to the group to which the at least one game assigned the advantageous condition belongs and displayed, and it may be possible to display the plurality of games belonging to the at least one group selected by the player on the group selection screen.

What is claimed is:

1. A non-transitory computer readable medium storing a program causing a computer to perform a method comprising:

displaying, by a display device, a game screen comprising a plurality of operation sections for selecting a plurality of games by a player;

obtaining, using an input unit and from the player, a selection of a first game among the plurality of games in response to displaying the game screen;

executing, using the input unit, the first game based on an operation performed by the player;

granting a reward among a plurality of rewards when the first game is cleared by the player and based on the cleared game, wherein the plurality of rewards are offered to the player for clearing the plurality of games;

displaying, by the display device, a reward specifying screen on which the player can specify a first desired reward among the plurality of rewards, wherein the reward specifying screen displays a second game among the plurality of games in which the first desired reward is available, and wherein the second game has a different enemy character and a different difficulty level from the first game;

displaying, by the display device, a skip selection screen for the second game in which the first desired reward specified on the reward specifying screen is available and for which a skip process for omitting a function is executable; and executing the skip process for the second game selected on the skip selection screen.

2. The non-transitory computer readable medium according to claim 1, wherein the method further comprises:

displaying a search screen on which the player can specify a second desired reward among the plurality of rewards, wherein the skip selection screen can display a third game among the plurality of games, in which the second desired reward specified on the search screen is available and for which the skip process is executable, wherein the skip selection screen includes a predetermined region that displays the second desired reward specified on the search screen, and wherein the predetermined region displays the second desired reward specified on the reward specifying screen when the skip selection screen is displayed for a first time after the second desired reward has been specified on the reward specifying screen.

3. The non-transitory computer readable medium according to claim 1, wherein the method further comprises:

assigning a third game among the plurality of games a condition, wherein the skip selection screen displays additional information capable of identifying the third game assigned the condition.

4. The non-transitory computer readable medium according to claim 3, wherein the method further comprises:

displaying a group selection screen on which the player can select a first group from a plurality of predetermined groups that are displayed on the group selection screen, wherein a respective game among the plurality of games belongs to a respective group of the plurality of predetermined groups, wherein the condition is assigned to all games included in the same group among the plurality of predetermined groups, wherein the group selection screen adds the additional information to the first group assigned the condition and displays the additional information, and wherein the skip selection screen can display at least one game belonging to the first group selected by the player on the group selection screen.

5. An information processing method executed by at least one of a player terminal and a server that can communicate with the player terminal, the information processing method comprising:

displaying, by a display device, a game screen comprising a plurality of operation sections for selecting a plurality of games by a player;

obtaining, using an input unit and from the player, a selection of a first game among the plurality of games in response to displaying the game screen;

executing, using the input unit, the first game based on an operation performed by the player;

granting a reward among a plurality of rewards when the first game is cleared by the player and based on the cleared game, wherein the plurality of rewards are offered to the player for clearing the plurality of games;

displaying, by the display device, a reward specifying screen on which the player can specify a first desired reward among the plurality of rewards, wherein the reward specifying screen displays a second game among the plurality of games in which the first desired reward is available, and wherein the second game has a different enemy character and a different difficulty level from the first game;

displaying, by the display device, a skip selection screen for the second game in which the first desired reward specified on the reward specifying screen is available and for which a skip process for omitting a function is executable; and executing the skip process for the second game selected on the skip selection screen.

6. The information processing method according to claim 5, the information processing method further comprising:

displaying a search screen on which the player can specify a second desired reward among the plurality of rewards, wherein the skip selection screen can display a third game among the plurality of games, in which the second desired reward specified on the search screen is available and for which the skip process is executable, wherein the skip selection screen includes a predetermined region that displays the second desired reward specified on the search screen, and wherein the predetermined region displays the second desired reward specified on the reward specifying screen when the skip selection screen is displayed for a first time after the second desired reward has been specified on the reward specifying screen.

7. The information processing method according to claim 5, the information processing method further comprising:

assigning a third game among the plurality of games a condition, wherein the skip selection screen displays additional information capable of identifying the third game assigned the condition.

8. The information processing method according to claim 7, the information processing method further comprising:

displaying a group selection screen on which the player can select a first group from a plurality of predetermined groups that are displayed on the group selection screen, wherein a respective game among the plurality of games belongs to a respective group of the plurality of predetermined groups, wherein the condition is assigned to all games included in the same group among the plurality of predetermined groups, wherein the group selection screen adds the additional information to the first group assigned the condition and displays the additional information, and wherein the skip selection screen can display at least one game belonging to the first group selected by the player on the group selection screen.

9. An information processing system including a player terminal and a server that can communicate with the player terminal, at least one of the player terminal and the server being configured to perform a method comprising:

displaying, by a display device, a game screen comprising a plurality of operation sections for selecting a plurality of games by a player;

obtaining, using an input unit and from the player, a selection of a first game among the plurality of games in response to displaying the game screen;

executing, using the input unit, the first game based on an operation performed by the player;

granting a reward among a plurality of rewards when the first game is cleared by the player and based on the cleared game, wherein the plurality of rewards are offered to the player for clearing the plurality of games;

displaying, by the display device, a reward specifying screen on which the player can specify a first desired reward among the plurality of rewards, wherein the reward specifying screen displays a second game among the plurality of games in which the first desired reward is available, and wherein the second game has a different enemy character and a different difficulty level from the first game;

displaying, by the display device, a skip selection screen for the second game in which the first desired reward specified on the reward specifying screen is available and for which a skip process for omitting a function is executable; and executing the skip process for the second game selected on the skip selection screen.

10. The information processing system according to claim 9, wherein the method further comprises:

displaying a search screen on which the player can specify a second desired reward among the plurality of rewards, wherein the skip selection screen can display a third game among the plurality of games, in which the second desired reward specified on the search screen is available and for which the skip process is executable, wherein the skip selection screen includes a predetermined region that displays the second desired reward specified on the search screen, and wherein the predetermined region displays the second desired reward specified on the reward specifying screen when the skip selection screen is displayed for a first time after the second desired reward has been specified on the reward specifying screen.

11. The information processing system according to claim 9, wherein the method further comprises:

assigning a third game among the plurality of games a condition, wherein the skip selection screen displays additional information capable of identifying the third game assigned the condition.

12. The information processing system according to claim 11, wherein the method further comprises:

displaying a group selection screen on which the player can select a first group from a plurality of predetermined groups that are displayed on the group selection screen, wherein a respective game among the plurality of games belongs to a respective group of the plurality of predetermined groups, wherein the condition is assigned to all games included in the same group among the plurality of predetermined groups, wherein the group selection screen adds the additional information to the first group assigned the condition and displays the additional information, and wherein the skip selection screen can display at least one game belonging to the first group selected by the player on the group selection screen.

* * * * *